(12) United States Patent
Miwa et al.

(10) Patent No.: US 9,760,294 B2
(45) Date of Patent: Sep. 12, 2017

(54) COMPUTER SYSTEM, STORAGE MANAGEMENT COMPUTER, AND STORAGE MANAGEMENT METHOD

(71) Applicant: Hitachi, Ltd., Tokyo (JP)

(72) Inventors: Kyoko Miwa, Tokyo (JP); Jun Nakajima, Tokyo (JP); Yukinori Sakashita, Tokyo (JP); Tsukasa Shibayama, Tokyo (JP); Masataka Nagura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 115 days.

(21) Appl. No.: 14/426,436

(22) PCT Filed: Nov. 7, 2012

(86) PCT No.: PCT/JP2012/078781
§ 371 (c)(1),
(2) Date: Mar. 6, 2015

(87) PCT Pub. No.: WO2014/073045
PCT Pub. Date: May 15, 2014

(65) Prior Publication Data
US 2015/0261462 A1   Sep. 17, 2015

(51) Int. Cl.
*G06F 12/02* (2006.01)
*G06F 3/06* (2006.01)

(52) U.S. Cl.
CPC .......... *G06F 3/0619* (2013.01); *G06F 3/0611* (2013.01); *G06F 3/0629* (2013.01);
(Continued)

(58) Field of Classification Search
None
See application file for complete search history.

(56) References Cited

U.S. PATENT DOCUMENTS

2008/0091748 A1   4/2008  Beniyama et al.
2011/0167236 A1   7/2011  Orikasa et al.
(Continued)

FOREIGN PATENT DOCUMENTS

EP    2 378 427 A1    10/2011
JP    2008-97502 A    4/2008
(Continued)

OTHER PUBLICATIONS

Extended European Search Report received in corresponding European Application No. 12888038.2 dated Mar. 14, 2016.

*Primary Examiner* — Charles Rones
*Assistant Examiner* — Ryan Dare
(74) *Attorney, Agent, or Firm* — Mattingly & Malur, PC

(57) ABSTRACT

A management computer stores, in a memory, virtual logical volume management information showing information on virtual logical volumes provided to a host computer by a storage device, and pool management information showing information related to a use status of pools. The management computer acquires performance information related to an access to the storage device from the host computer, determines whether the acquired performance related to the access satisfies a predetermined first required performance, or not, and specifies any virtual logical volume which is a cause of the state based on the virtual logical volume management information if the first required performance is not satisfied. The management computer calculates a capacity consumption trend of the real area included in each pool based on the pool management information, creates a countermeasure for satisfying the first required performance implementable after a given time, and outputs the countermeasure to an output device.

10 Claims, 26 Drawing Sheets

(52) U.S. Cl.
CPC .......... *G06F 3/0647* (2013.01); *G06F 3/0653* (2013.01); *G06F 3/0685* (2013.01); *G06F 3/0689* (2013.01); *G06F 12/023* (2013.01); *G06F 3/0665* (2013.01); *G06F 2003/0692* (2013.01)

(56) References Cited

U.S. PATENT DOCUMENTS

| | | |
|---|---|---|
| 2011/0197044 A1 | 8/2011 | Sudo et al. |
| 2011/0246740 A1 | 10/2011 | Yata et al. |
| 2011/0252214 A1* | 10/2011 | Naganuma ............ G06F 3/0607 711/170 |
| 2012/0005435 A1* | 1/2012 | Emaru .................. G06F 3/0608 711/154 |
| 2012/0042124 A1* | 2/2012 | Miyamoto ............ G06F 3/0605 711/114 |
| 2012/0166748 A1 | 6/2012 | Satoyama et al. |

FOREIGN PATENT DOCUMENTS

| | | |
|---|---|---|
| WO | 2011/092738 A1 | 8/2011 |
| WO | 2011/092739 A1 | 8/2011 |
| WO | 2012/020471 A1 | 2/2012 |

* cited by examiner

FIG. 3

| Pool ID (501) | PAGE ID (502) | LDEV ID (503) | Tier LEVEL (504) | Access Frequency LIMIT (IOPS) (505) | Access Frequency (IOPS)/LDEV (506) | LDEV LBA (507) START | LDEV LBA (507) END | VVOL ID (508) | VVOL LBA (509) START | VVOL LBA (509) END | Access Frequency (IOPS)/Page (510) |
|---|---|---|---|---|---|---|---|---|---|---|---|
| Pool A | 0000 | LDEV 1 | Tier 1 | 200,000 | 145,000 | 0 | 0999 | VVOL 2 | 0135000 | 0135999 | 12531 |
| | 0001 | | | | | 1000 | 1999 | VVOL 1 | 0094600 | 0094699 | 2 |
| | 0002 | | | | | 2000 | 2999 | N/A | - | 0 | - |
| | ... | | | | | ... | ... | ... | ... | ... | ... |
| | 1000 | LDEV 2 | Tier 2 | 18,000 | 9,600 | 0 | 0999 | VVOL 2 | 0055000 | 0055999 | 0 |
| | ... | | | | | ... | ... | ... | ... | ... | ... |
| | 2000 | LDEV 3 | Tier 2 | 18,000 | 12,000 | 0 | 0999 | VVOL 3 | 4398000 | 4398999 | 950 |
| | ... | | | | | ... | ... | ... | ... | ... | ... |
| | 2001 | LDEV 4 | Tier 3 | 12,000 | 2,9000 | 0000 | 0999 | VVOL 1 | 0001000 | 0001999 | 0 |
| | ... | | | | | ... | ... | ... | ... | ... | ... |
| ... | | | | | | | | | | | |

302

F I G. 4

| VOL ID | Capacity | VOL Type | Port ID | Host ID | Pool ID |
|---|---|---|---|---|---|
| VOL 1 | 600GB | VVOL | Port 1 | Host 1 | Pool 1 |
| VOL 2 | 200GB | VVOL | Port 2 | Host 2 | Pool 2 |
| ... | ... | ... | ... | ... | ... |
| LDEV 1 | 50GB | SSD | N/A | N/A | N/A |
| LDEV 2 | 50GB | SAS | N/A | N/A | N/A |
| ... | ... | ... | ... | ... | ... |

| VVOL ID | Subsystem ID | CAPACITY (GB) | USE CAPACITY (GB) | Pool ID | Port ID | Host ID | VM ID | VM OPERATION TIME | REQUIRED PERFORMANCE (ms) |
|---|---|---|---|---|---|---|---|---|---|
| VVOL 1 | Storage 1 | 30 | 10 | Pool 1 | Port 1 | Host 1 | VM 1 | EVERY DAY 8:00-21:00 | 4 |
| VVOL 2 | Strage 1 | 30 | 10 | Pool 2 | Port 2 | Host 2 | VM 2 | EVERY DAY 0:00-8:00 | 2 |
| VVOL 3 | Storage 2 | 30 | 10 | Pool 3 | Port 3 | Host 3 | VM 4 | EVERY DAY 8:00-21:00 | 6 |
| VVOL 4 | Storage 1 | 30 | 19 | Pool 1 | Port 1 | Host 1 | VM 3 | EVERY DAY 0:00-8:00 | 4 |

| 911 | 912 | 913 | 914 | 915 | 916 | | 917 | 918 |
|---|---|---|---|---|---|---|---|---|
| ALLOWABLE DOWN TIME (h) | ALLOWABLE COST | TIME | VM PERFORMANCE (ms) | VVOL PERFORMANCE (ms) | ACCESS DISTRIBUTION | | NEW PAGE ALLOCATION CAPACITY (GB/h) | PORT LOAD (MB/h) |
| | | | | | 0-249 IOPS (PAGE) | ... | TOTAL (PAGE) | |
| 5 | $10000 | 2012/1/1 9:00-9:59 | 4 | 2 | 5000 | ... | 30000 | 2 |
| | | 2012/1/1 10:00-11:59 | 4 | 2 | 4800 | ... | 31000 | 4 |
| | | 2012/1/1 11:00-12:59 | 3 | 6 | 5100 | ... | 29000 | 6 |
| 2 | $20000 | 2012/1/1 9:00-9:59 | 0 | 0 | 0 | ... | 0 | 0 |
| | | 2012/1/1 10:00-11:59 | 0 | 0 | 0 | ... | 0 | 0 |
| | | 2012/1/1 11:00-12:59 | 0 | 0 | 0 | ... | 0 | 0 |
| 10 | $5000 | ... | ... | ... | ... | ... | ... | ... |
| 5 | $10000 | ... | ... | ... | ... | ... | ... | ... |

| POOL ID 1101 | Sub System ID 1102 | TIME 1103 | NEW PAGE ALLOCATION CAPACITY (GB/h) 1104 |
|---|---|---|---|
| POOL 1 | Storage 1 | 1/1/2012 0:00-0:59 | 1 |
|  |  | 1/1/2012 1:00-1:59 | 0.8 |
|  |  | 1/1/2012 2:00-2:59 | 1.2 |
| POOL 2 | Storage 1 | 1/1/2012 0:00-0:59 | 1 |
|  |  | 1/1/2012 1:00-1:59 | 0.8 |
|  |  | 1/1/2012 2:00-2:59 | 1.2 |
| POOL 3 | Storage 2 | 1/1/2012 0:00-0:59 | 0.7 |
| ... | ... | ... | ... |

| PORT ID 1201 | MAXIMUM ALLOWABLE LOAD (MB/h) 1202 | SUB SYSTEM ID 1203 | TIME 1204 | PORT LOAD (MB/h) 1205 |
|---|---|---|---|---|
| PORT 1 | 20 | STORAGE 1 | 2012/1/1 0:00-0:59 | 10 |
|  |  |  | 2012/1/1 1:00-1:59 | 12 |
|  |  |  | 2012/1/1 2:00-2:59 | 14 |
| PORT 2 | 40 | STORAGE 1 | 2012/1/1 0:00-0:59 | 8 |
|  |  |  | 2012/1/1 1:00-1:59 | 10 |
|  |  |  | 2012/1/1 2:00-2:59 | 13 |
| PORT 3 | 10 | STORAGE 2 | 2012/1/1 0:00-0:59 | 6 |
| ... |  | ... | ... | ... |

| Tier Level | Media Type | Performance (msec) | Access Frequency Limit (IOPS) | Cost |
|---|---|---|---|---|
| Tier 1 | SSD | 1 | 25000 | 20 |
| Tier 2 | SAS | 10 | 2500 | 2 |
| Tier 3 | SATA | 20 | 1250 | 1 |

| TASK TYPE | EXECUTABLE MANAGEMENT AUTHORITY |
|---|---|
| Volume Migration | STORAGE MANAGER |
| VM Migration | SERVER MANAGER |
| Pool Expand | STORAGE MANAGER |

| COUNTERMEASURES ID | | COUNTERMEASURE DETAILED INFORMATION | | | | EFFECTS | | | | | EXECUTION RECOMMENDATION LEVEL | AUTOMATIC EXECUTION PROPRIETY | LAST AUTOMATIC EXECUTION |
|---|---|---|---|---|---|---|---|---|---|---|---|---|---|
| | Task ID | Task TYPE | TASK PARAMETER | TASK EXECUTION AUTHORITY | | RESPONSE PERFORMANCE (ms) | EXECUTION TIME (h) | EXECUTION COSTS ($) | INFLUENCE VM ID | | | | |
| 1 | Task 1 | VOLUME MIGRATION | MIGRATION VVOL:VVOL 1 MIGRATION SOURCE POOL:Pool 1 MIGRATION DESTINATION POOL:Pool 3 | STORAGE MANAGER | | 3 | 4 | 0 | VM3 | | 90 | YES | NO |
| | Task 2 | VOLUME MIGRATION | MIGRATION VVOL:VVOL 3 MIGRATION SOURCE POOL:Pool 3 MIGRATION DESTINATION POOL:Pool 1 | STORAGE MANAGER | | | | | | | | | |
| 2 | Task 1 | Pool Expand | TARGET POOL:Pool A ADDED MEDIA:SSD30G | STORAGE MANAGER | | 1 | 2 | 5000 | NO | | 75 | NO | - |
| 1601 | 1602 | 1603 | 1604 | 1605 | | 1606 | 1607 | 1608 | 1609 | | 1610 | 1611 | 1612 |

| AUTOMATIC EXECUTION DETERMINATION ATTRIBUTE | DETERMINATION PARAMETER |
|---|---|
| USE RESOURCE | Storage X |
|  | RESOURCE USED IN VM X |
| EXECUTION AUTHORITY | SERVER MANAGEMENT AUTHORITY IS UNNECESSARY |
| THE NUMBER OF INFLUENCE VM | 5 OR LOWER |
| EXECUTION TIME | 2 HOURS |
| EXECUTION COSTS | $1000 |

COUNTERMEASURE SELECT SCREEN

PRESENT RECOMMENDED COUNTERMEASURES ASSUMING THAT COUNTERMEASURE IS EXECUTED AT 12:00 OF 2012/5/1 IN RECOMMENDATION ORDER.
PLEASE SELECT COUNTERMEASURE TO BE EXECUTED, AND PRESS COUNTERMEASURE EXECUTION BUTTON.

25000

| SELECT | COUNTER-MEASURES ID | COUNTERMEASURE DETAILED INFORMATION ||||| EFFECTS |||| AUTOMATIC EXECUTION PROPRIETY |
|---|---|---|---|---|---|---|---|---|---|---|
| | | Task ID | Task TYPE | TASK PARAMETER | TASK EXECUTION AUTHORITY | RESPONSE PERFORMANCE (ms) | EXECUTION TIME (h) | EXECUTION COSTS ($) | INFLUENCE VM ID | |
| ✓ | 1 | Task 1 | Volume Migration | MIGRATION VVOL:VVOL 1<br>MIGRATION SOURCE POOL:Pool 1<br>MIGRATION DESTINATION POOL:Pool 3 | STORAGE MANAGEMENT | 3 | 4 | 0 | VM3 | Yes<br>*LAST |
| | | Task 2 | Volume Migration | MIGRATION VVOL:VVOL 2<br>MIGRATION SOURCE POOL:Pool 3<br>MIGRATION DESTINATION POOL:Pool 1 | STORAGE MANAGEMENT | | | | | |
| ☐ | 2 | Task 1 | Pool Expand | TARGET POOL:Pool A<br>ADDED MEDIA:SSD30G | STORAGE MANAGEMENT | 1 | 2 | 5000 | No | No |

25001

[ COUNTERMEASURE EXECUTION ]

FIG.21

RECOMMENDED COUNTERMEASURES TO BE EXECUTED AT 13:00

| COUNTERMEASURE ID | COUNTERMEASURE DETAILED INFORMATION ||||| EFFECTS ||||
|---|---|---|---|---|---|---|---|---|
| | Task ID | Task TYPE | Task PARAMETER | Task EXECUTION AUTHORITY | RESPONSE PERFORMANCE (ms) | EXECUTION TIME (h) | EXECUTION COSTS ($) | INFLUENCE VM ID |
| 1 | ... | ... | ... | ... | ... | ... | ... | ... |
| 2 | ... | ... | ... | ... | ... | ... | ... | ... |

RECOMMENDED COUNTERMEASURES TO BE EXECUTED AT 14:00

| COUNTERMEASURE ID | COUNTERMEASURE DETAILED INFORMATION ||||| EFFECTS ||||
|---|---|---|---|---|---|---|---|---|
| | Task ID | Task TYPE | Task PARAMETER | Task EXECUTION AUTHORITY | RESPONSE PERFORMANCE (ms) | EXECUTION TIME (h) | EXECUTION COSTS ($) | INFLUENCE VM ID |
| 1 | ... | ... | ... | ... | ... | ... | ... | ... |
| 2 | ... | ... | ... | ... | ... | ... | ... | ... |

| SCHEDULED EXECUTION TIME | COUNTERMEASURE ID | COUNTERMEASURE DETAILED INFORMATION ||||| EFFECTS |||| INFLUENCE VM ID | EXECUTION RECOMMEN-DATION LEVEL | AUTOMATIC EXECUTION PROPRIETY |
|---|---|---|---|---|---|---|---|---|---|---|---|---|
| | | Task ID | Task TYPE | Task PARAMETER | Task EXECUTION AUTHORITY | RESPONSE PERFORMANCE (ms) | EXECUTION TIME (h) | EXECUTION COSTS ($) | | | | |
| 2012/5/1 12:00 | 1 | Task1 | VolumeMigration | ... | STORAGE MANAGEMENT | 3 | 4 | 0 | VM3 | 2 | Yes |
| | | Task2 | VolumeMigration | ... | STORAGE MANAGEMENT | | | | | | |
| 2012/5/2 13:00 | 2 | Task1 | PoolExpand | ... | STORAGE MANAGEMENT | 1 | 2 | 5000 | None | 1 | No |
| 2012/5/2 14:00 | 1 | Task1 | VOLUME EXPAND | ... | ... | ... | ... | ... | ... | ... | ... |
| 1613 | 1601 | 1602 | 1603 | 1604 | 1605 | 1606 | 1607 | 1608 | 1609 | 1610 | 1611 |

FIG.24

COUNTERMEASURE EXECUTION CONFIRMATION SCREEN 29000

- PRESENT COUNTERMEASURE AGAINST SYSTEM STATE.
- PLEASE PRESS CANCEL BUTTON WHEN EXECUTION OF COUNTERMEASURE SCHEDULED TO BE AUTOMATICALLY EXECUTED IS CANCELED.
- PLEASE PRESS EXECUTION BUTTON WHEN COUNTERMEASURE NOT SCHEDULED TO BE EXECUTED IS EXECUTED. START PROCESSING WHEN COUNTERMEASURE IS EXECUTED IN DISPLAYED EXECUTION TIME.

29001

| COUNTERMEASURE ID | COUNTERMEASURE DETAILED INFORMATION | | | | EFFECTS | | | | SCHEDULED EXECUTION TIME | |
|---|---|---|---|---|---|---|---|---|---|---|
| | Task ID | Task TYPE | Task PARAMETER | Task EXECUTION AUTHORITY | RESPONSE PERFORMANCE (ms) | EXECUTION TIME (h) | EXECUTION COSTS ($) | INFLUENCE VM ID | | |
| 1-A | Task 1 | Volume Migration | ... | STORAGE MANAGEMENT | 3 | 4 | 0 | VM3 | – | EXECUTION |
| | Task 2 | Volume Migration | ... | STORAGE MANAGEMENT | | | | | | EXECUTION TIME: 2012/5/3 14:00 |
| 2-C | Task 1 | Volume Migration | ... | STORAGE MANAGER | 1 | 2 | 5000 | None | 2012/5/1 13:00 | CANCEL |
| ... | ... | ... | ... | ... | ... | ... | ... | ... | ... | ... |

| COUNTERMEASURE ID | Task ID | Task TYPE | COUNTERMEASURE DETAILED INFORMATION ||| EFFECTS FOR EACH Task |||| EFFECTS ||||| EXECUTION RECOMMENDATION LEVEL |
|---|---|---|---|---|---|---|---|---|---|---|---|---|---|---|
| | | | Task PARAMETER | Task EXECUTION AUTHORITY | EXECUTION TIME (h) | EXECUTION COSTS ($) | STATE TO BE SOLVED | REMAINING STATE | RESPONSE PERFORMANCE (ms) | EXECUTION TIME (h) | EXECUTION COSTS ($) | EXECUTION INFLUENCE VM ID | |
| 1 | Task 1 | Volume Migration | MIGRATION VVOL:VVOL 1 MIGRATION SOURCE POOL:Pool 1 MIGRATION DESTINATION POOL:Pool 3 | STORAGE MANAGEMENT | 4 | 0 | VM1 RESPONSE DELAY | VM3 RESPONSE DELAY | 3 | 4 | 0 | VM3 | 90 |
| | Task 2 | Volume Migration | MIGRATION VVOL:VVOL 3 MIGRATION SOURCE POOL:Pool 3 MIGRATION DESTINATION POOL:Pool 1 | STORAGE MANAGEMENT | 2 | 0 | VM3 RESPONSE DELAY | No | | | | | |
| 2 | Task 1 | Pool Expand | TARGET POOL:Pool A ADDED MEDIA:SSD30G | STORAGE MANAGEMENT | 2 | 5000 | VM1 RESPONSE DELAY | No | 1 | 2 | 5000 | No | 75 |

EXECUTION TASK SELECT SCREEN

PLEASE PRESS EXECUTION BUTTON OF TASK TO BE IMMEDIATELY EXECUTED

| COUNTERMEASURE ID | EFFECTS WHEN ALL TASKS ARE EXECUTED | | | COUNTERMEASURE DETAILS | | | EFFECTS FOR EACH TASK | | | | |
|---|---|---|---|---|---|---|---|---|---|---|---|
| | RESPONSE PERFORMANCE (ms) | EXECUTION TIME (h) | EXECUTION COSTS ($) | INFLUENCE VM ID | Task ID | Task TYPE | Task PARAMETER | EXECUTION TIME (h) | EXECUTION COSTS ($) | STATE TO BE SOLVED | REMAINING STATE | |
| 1 | 3 | 4 | 0 | VM3 | Task 1 | Volume Migration | MIGRATION VVOL: VVOL1 MIGRATION SOURCE POOL: Pool1 MIGRATION DESTINATION POOL: Pool3 | 2 | 0 | VM1 RESPONSE DELAY | VM3 RESPONSE DELAY | EXECUTION 31002 |
| | | | | | Task 2 | Volume Migration | MIGRATION VVOL: VVOL3 MIGRATION SOURCE POOL: Pool3 MIGRATION DESTINATION POOL: Pool1 | 4 | 0 | VM3 RESPONSE DELAY | No | EXECUTION 31003 |

31000
31001

COMPUTER SYSTEM, STORAGE MANAGEMENT COMPUTER, AND STORAGE MANAGEMENT METHOD

TECHNICAL FIELD

The present invention relates to a computer system including a storage device, and more particularly to a countermeasure technique for improving a state of the system.

TECHNICAL FIELD

In recent years, a technique called "thin provisioning" has been actively used in a storage system. Patent Literature 1 discloses a capacity monitoring method of a pool in the thin provisioning. A storage device or a management server provides a thin provisioning volume to a business server from a storage area of a physical volume belonging to a storage pool. The management server monitors a use capacity of the storage pool, determines whether a storage capacity necessary for operating the business server for a given period is present in the storage pool, or not, and conducts a given countermeasure if the necessary storage capacity is not present.

Also, Patent Literature 2 discloses a technique of monitoring a status of a virtual logical volume (hereinafter called "VVOL") configured by plural virtual areas, and conducts migration related to pools associated with the VVOL for the purpose of improving the status of the VVOL which is under an improper situation.

Patent Literature 1: Japanese Unexamined Patent Application Publication No. 2008-097502
Patent Literature 2: International Publication No. WO2011092738

SUMMARY OF INVENTION

Technical Problem

In an operations management of the computer system, it is conceivable that after countermeasures for improving a state of the storage system have been created, a given time is required since it is determined that an improvement in the state is necessary until the countermeasure is actually executed, for example, due to the selection of the countermeasure to be actually applied, or approval operation of the countermeasure execution by a higher-level manager.

Even during that time, a normal work, that is, an I/O (input/output) issuance from a host computer to the storage system is continuously conducted. For that reason, the state of the storage system until the actual countermeasure execution may be changed, and an expected effect may not be obtained by the countermeasure created on the basis of the state before changing.

An object of the present invention is to create a countermeasure taking a change in the state of the storage system into account.

Solution to Problem

A management computer provided by the present invention stores, in a memory, virtual logical volume management information indicative of information on virtual logical volumes provided to a host computer by a storage device, and pool management information indicative of information related to a use status of pools each for allocating a real area to the virtual logical volume according to a write access from the host computer, which is configured by a real area group provided by the storage device. A processor of the management computer acquires performance information related to an access to the storage device from the host computer, determines whether the acquired performance related to the access satisfies a predetermined first required performance, or not, and specifies any virtual logical volume which is a cause of the state on the basis of the virtual logical volume management information if the first required performance is not satisfied. The processor calculates a capacity consumption trend of the real area included in each pool on the basis of the pool management information, creates a countermeasure for satisfying the first required performance which can be implemented after a given time, and outputs the countermeasure to an output device.

Advantageous Effects of Invention

According to the present invention, the effective countermeasure taking a change in the state of the storage system into account can be created.

BRIEF DESCRIPTION OF DRAWINGS

FIG. 3 illustrates a pool management table according to the first embodiment.
FIG. 4 illustrates a VOL management table according to the first embodiment.
FIG. 5 illustrates a part of a VVOL management table according to the first embodiment.
FIG. 6 illustrates the residual of the VVOL management table according to the first embodiment.
FIG. 7 illustrates a pool capacity consumption trend management table according to the first embodiment.
FIG. 8 illustrates a port load trend management table according to the first embodiment.
FIG. 9 illustrates a tier definition management table according to the first embodiment.
FIG. 10 illustrates a task execution authority management table according to the first embodiment.
FIG. 11 illustrates a creating countermeasure management table according to the first embodiment.
FIG. 12 illustrates an automatic execution determination management table according to the first embodiment.

FIG. 20 illustrates one example of a countermeasure list presentation interface according to the first embodiment.

FIG. 21 illustrates another example of the countermeasure list presentation interface according to the first embodiment.

FIG. 22 illustrates a creating countermeasure management table according to a second embodiment.

FIG. 24 illustrates a countermeasure list presentation interface according to the second embodiment.

FIG. 25 illustrates a creating countermeasure management table according to a third embodiment.

FIG. 26 illustrates an execution task selection interface according to a third embodiment.

DESCRIPTION OF EMBODIMENTS

Several embodiments will be described with reference to the drawings. The embodiments described below are not limited to the invention of the claims, and all of various elements described in the embodiments, and the combinations thereof are not always essential for solution of the invention.

In the following description, a variety of information may be described by expression of "aaa table", but the variety of information may be expressed by a data structure other than a table. The "aaa table" can be called "aaa information" for the purpose of indicating that the variety of information does not depend on the data structure. Further, information elements including values in respective columns within the table are called "entries", and the entry of "aaa table" is called "aaa table entry" for description.

Also, in the following description, processing may be conducted merely by a management computer and a host computer as subjects. However, the processing is executed by a processor (for example, CPU (central processing unit) of a control device provided in each of the computers. Likewise, when the processing is conducted merely by a storage device as the subject in the description, a controller provided in the storage device executes the processing. Also, at least one of the control device and the controller may be a processor per se, or may include a hardware circuit that conducts a part or all of processing to be conducted by the control device or the controller.

A program may be installed in the respective computers or the storage device from a program source. The program source may be configured by, for example, a program distribution server or a storage media.

First Embodiment

Figure 1:
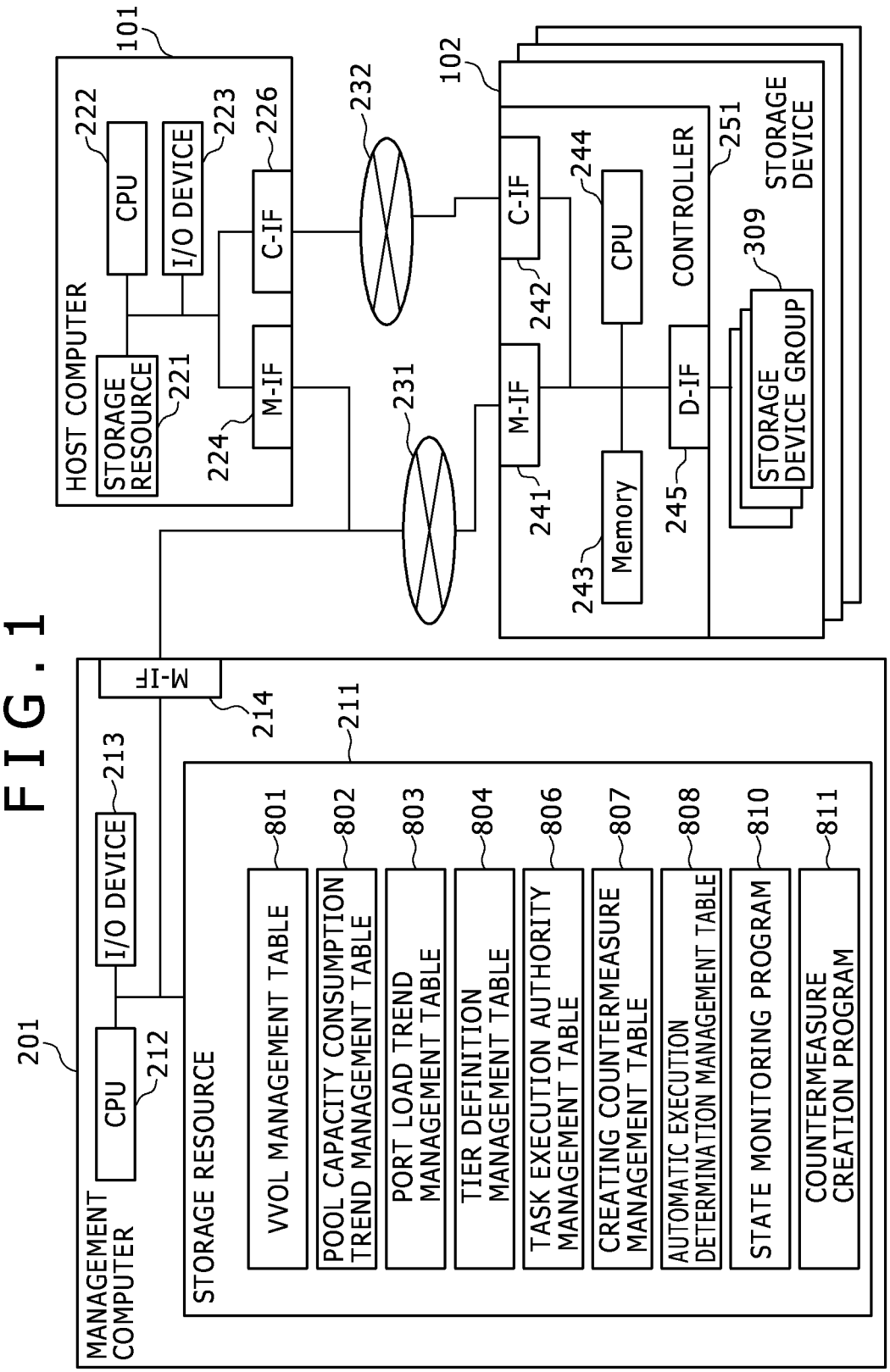
FIG. 1 illustrates a configuration of a computer system according to a first embodiment.

FIG. 1 illustrates a configuration of a computer system according to a first embodiment.

A storage device 102 is connected to a management computer 201 and a host computer 101 through a first communication network 231 such as a LAN (local area network). Also, the storage device 102 is connected to the host computer 101 through a second communication network 232 such as a SAN. The first communication network 231 and the second communication network 232 may be integrated together.

Figure 2:
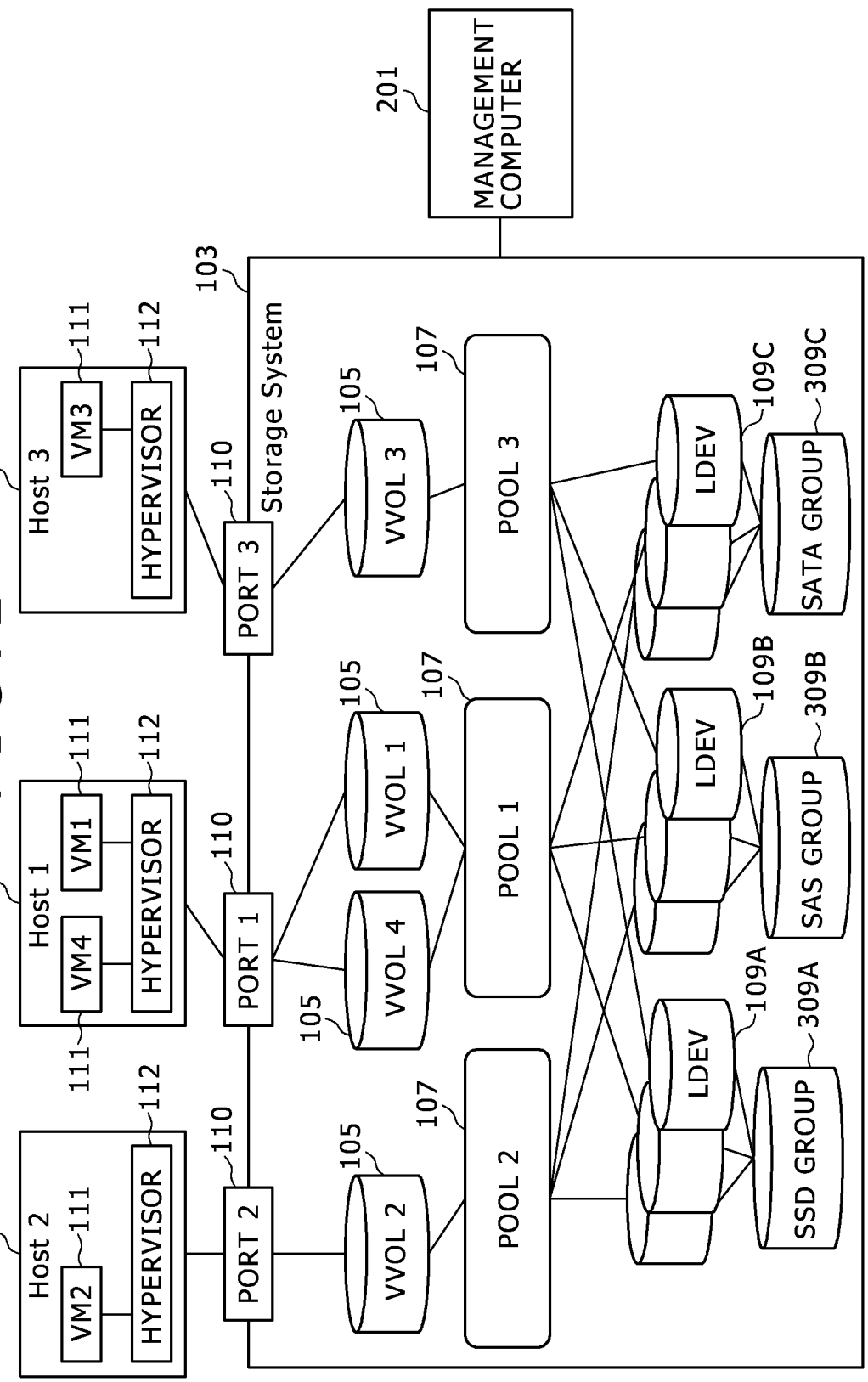
FIG. 2 illustrates a conceptual diagram of the computer system according to the first embodiment.

The storage device 102 includes a physical storage device group, and a controller 251 connected to the physical storage device group. The physical storage device group is configured by one or more physical storage devices. As illustrated in FIG. 2, the physical storage device group includes an SSD group 309A, an SAS group 309B, and an SATA group 309C. The SSD group 309A includes one or more SSD (solid state drive), the SAS group 309B includes one or more SAS (serial attached SCSI)-HDD, and the SATA group 309C includes one or more SATA (serial ATA (advanced technology attachment))-HDD. In this way, the storage device 203 has plural physical storage devices different in performance mixed together. The physical storage device group may be provided from an external of the storage device 102.

The controller 251 includes a management I/F (hereinafter referred to as "M-I/F") 241, a communication I/F 242 (hereinafter referred to as "C-I/F") 242, a device I/F (hereinafter referred to as "D-I/F") 245, a memory 243, and a processor 244 connected to those components.

The M-I/F 241 is a communication interface device for conducting a communication by a first protocol, which is, for example, an NIC (network interface card). The C-I/F 242 is a communication interface device for conducting a communication by a second protocol.

The D-I/F 245 is a communication interface device for communicating the physical storage devices by a third protocol. The D-I/F 245 may be provided for each type of the physical storage devices. The controller 251 accesses to the physical storage devices through the D-I/F 245.

The memory 243 stores computer programs to be executed in the processor 244, and a variety of information therein. Also, the memory 243 has a cache memory area. Data responsive to a write command received from the host computer 101, and data read from a real data storage area (hereinafter referred to as "page") on each of the physical storage devices in response to a read command received from the host computer 101 is temporarily stored in a cache memory area. The data to be written within the cache memory area is stored in the physical storage devices allocated to the write destination virtual areas. The data to be read within the cache memory area is supplied to the host computer 101.

A pool management table 302, a VOL management table 304, and a pool management program 305 are stored in the memory 243. The pool management program 305 is configured to manage pools 107 provided in the storage device 102 which will be described later. The pool management program 305 is executed by the processor 244, and a variety of processing is realized on the basis of a variety of tables.

A storage system 103 which will be described later is configured by the collection of one or more storage devices 102.

The host computer 101 includes an M-I/F 224, a C-I/F 226, a storage resource 221, a processor 222 connected to those components, and an I/O device 223. The M-I/F 224 is, for example, an NIC, and the C-I/F 226 is, for example, an HBA (host bus adapter). The storage resource 221 is, for example, a memory, and may include an auxiliary storage device such as an HDD (hard disk device). The storage resource 221 stores, for example, an application program such as a business program, and an OS (operating system) therein, and the processor 222 executes the application program and the OS. The I/O device 223 includes an input unit (for example, a keyboard, a switch, a pointing device, and/or a microphone) that accepts an input from a user, and an output unit (for example, a display device and/or a speaker) that displays a variety of information for the user.

The management computer 201 includes an M-I/F 214, a storage resource 211, a processor 212 connected to those components, and an I/O device 213. The M-I/F 214 is, for example, an MIC. The I/O device 213 is identical with the I/O device 223.

The storage resource 211 is, for example, a memory, and may include an auxiliary storage device such as an HDD. The storage resource 211 stores computer programs and a variety of information therein. The computer programs are executed by the processor 212. A VVOL management table 801, a pool capacity consumption trend management table 802, a port load trend management table 803, a tier definition management table 804, a task execution authority management table 806, a creating countermeasure management table 807, and an automatic execution determination management table 808 are stored in the storage resource 211 as information. A state monitoring program 810, and a countermeasure creating program 811 are stored as the programs.

The configuration of hardware of the computer system according to the first embodiment is described above. The above-mentioned communication interface devices such as the M-I/F and the C-I/F are different, for example, according to the type of the network connected to the I/F, and the type of a device having the I/F.

FIG. 2 is a conceptual diagram of the computer system according to the first embodiment.

The storage system 103 is configured by one or more storage devices 102. At least one of the storage devices 102 is a storage device employing the thin provisioning technique. The storage system 103 has plural logical volumes (hereinafter called "LDEV") which is configured by real areas of the physical storage devices, and different in the performance.

In this embodiment, the collection of three types of LDEV is considered. Specifically, there are an LDEV 109A configured by the SSD, an LDEV 109B configured by the SAS, and an LDEV 109C configured by the SATA.

The collection of the logical volumes provided in the storage system 103 may be, for example, the collection of three logical volumes at least one of which is a different type of logical volume. Also, the number of collections of the logical volumes may be two or more. For example, the logical volumes of the same type may be divided into two or more different collections according to the access performance. For example, the LDEV 109B of the SAS may be divided into a collection of SAS [10 K/rpm] (SAS of 10,000 [revolutions/min] in rotating speed), and a collection of SAS [15K/rpm] (SAS of 15,000 [revolutions/min] in rotating speed). Also, the logical volume provided from another storage device different from the storage device having the pools 107 may be provided.

The storage system 103 has one or more pools 107. Each of the pools 107 is configured by plural LDEV different in the performance. For example, each of the pools 107 is configured by one or more LDEV in the LDEV 109A including the SSD, one or more LDEV in the LDEV 109B including the SAS, and one or more LDEV in the 109C including the SATA. Each LDEV is partitioned into plural pages. For that reason, each of the pools 107 includes an SSD page group, an SAS page group, and an SATA page group. Each LDEV configures a component of one pool, and may not configure a common element of two or more pools. Wire connections between the pools 107 and the respective LDEV 109 do not mean physical connections, but represent that the pools 107 include the LDEV 109 as described above.

One pool 107 can be grouped into plural tiers. One tier includes one or more LDEV of the same performance. For example, there is a tier including the SSD as a higher-level tier, there is a tier including the SAS as a middle-level tier, and there is a tier including the SATA as a lower-level tier. The "same performance" may mean completely the same performance, or may include substantially the same performance, for example, such that a difference in the access performance is equal to or lower than a given difference.

Each tier is associated with an access frequency range. The access frequency is the number of accesses per unit time, and is represented by, for example, an IOPS (input output per second). The IOPS is a unit of the number of accesses (I/O) per second.

The storage system 103 has plural VVOL 105. The VVOL 105 is a virtual logical volume complying with the thin provisioning technique, and includes plural virtual areas which is virtual storage areas. Each of the virtual areas is an address such as an LBA (logical block addressing). When receiving the write command designating the VVOL 105 from the host computer 101, if a page which is the real area is allocated to the write destination virtual area which is specified from the write command, the storage system 103 writes data into the page. If the page is not allocated to the virtual area, the storage system 103 allocates an unused page thereto from a pool associated with the write destination VVOL 105, and writes data to be written responsive to the write command into the allocated page.

The host computer 101 is an example of an access source to the storage system 103. The host computer 101 has a hypervisor 112 that logically creates a VM (virtual machine) 111 to make the VM 111 executable. The hypervisor can control plural VM 111 at a time. Each of the plural VM 111 can execute the application like a physical computer of stand-alone. Also, the hypervisor 112 can conduct VM migration for migrating the VM 111 operating on one host to another host.

The VVOL 105 is supplied to any one VM 111 among the plural VM 111. In the first embodiment, the VVOL 105 and the VM 111 corresponds to the VM 111 one on one. In FIG. 2, the wire connections between the host computer 101 and the VVOL 105 do not means physical connections, but represent that the VVOL 105 is supplied to the host computer 101, and recognized by the host computer 101. Likewise, the wire connections between the pools 107 and the VVOL 105 do not mean the physical connections, but represent that the VVOL 105 is associated with the pools 107.

The host computer accesses to the provided VVOL 105 in response to a request from the VM 111. Specifically, the host computer 101 transmits an access command having access destination information to the storage system 103. The access destination information represents an access destination, and includes, for example, an ID of the VVOL 105 such as an LUN (logical unit number), and an ID of the virtual area such as the LBA.

FIG. 3 illustrates the pool management table 302. The pool management table 302 stores information on the pools 107. The LDEV configuring the pool, the tier to which the LDEV belongs, the correspondence relationship between each page and the virtual area, and the IOPS for each page are found from the pool management table 302. The controller 251 collects the information from the respective components of the storage system 103 regularly or upon receiving an information collection request from the external, and stores the collected information in the pool management table 302.

Specifically, the pool management table 302 has the following information. A pool ID 501 is information for identifying the pools 107. A page ID 502 is information for identifying the page belonging to the pool 107. An LDEV ID 503 is information for identifying the LDEV having the page. A tier level 504 is information representing a level of the tier to which the LDEV belongs. An access frequency limit 505 is information indicative of an upper limit value of the access frequency to the LDEV. In FIG. 3, the access frequency limit 505 is indicated as an upper limit of the I/O number (IOPS) to the LDEV within a unit time. An LDEV access frequency 506 is information indicative of the access frequency to the LDEV. In FIG. 3, the LDEV access frequency 506 is indicative of the I/O number (IOPS) to the LDEV within the unit time. An LDEV LBA 507 is information indicative of a position (for example, an LBA on a head of a page, and an LBA on a terminal of the page) of the page in the LDEV.

A VVOL ID 508 is information for identifying the VVOL having the virtual area of the allocation destination of the page. "N/A (not/assigned)" indicates that the page is not allocated to any virtual areas. A VVOL LBA 509 is information indicative of a position (for example, the LBA on a head of a page, and the LBA on a terminal of the page) of the page in the LDEV. A page access frequency 510 is information indicative of the frequency of the access to the page. The access frequency may be divided into "frequency of write" and "frequency of read" for management. The access frequency is updated when the page is accessed, and not updated when the access command is received, but the page is not accessed.

FIG. 4 illustrates the VOL management table 304. The VOL management table 304 has information related to a volume provided in the storage system 103. The VOL management table 304 stores information on the volume providable to the host computer 101 by the storage system 103 therein, and an object in which the information is stored may be all or only a part of the volumes provided in the storage system 103. If the volume is the VVOL, the host computer 101 to which the VVOL provides the virtual area, and the pool 107 that allocates the page to that VVLO are found by the VOL management table 304.

A VOL ID 701 is information for identifying the VVOL or the LDEV. A capacity 702 is indicative of a storage capacity of the VVOL or LDEV. A volume type 703 is indicative of whether the type of the volume is VVLO or any LDEV. If the volume is LDEV, the volume type 703 is indicative of the SSD, the SAS, or the SATA. A port ID 704 is information for identifying a storage port associated with the VVOL. A host ID 705 is information for identifying the host computer to which the volume is provided. In an example of FIG. 4, the LDEV1 and the LDEV2 are not directly allocated to the host computer 101. A pool ID 706 is information for identifying the pool associated with the VVOL.

The pool management program 305 conducts, for example, the following processing on the basis of the pool management table 302 and the VOL management table 304.
(A) The pool management program 305 conducts write processing including the following processing (a1) to (a9).
(a1) The pool management program 305 receives the write command from the host computer 101.
(a2) The pool management program 305 specifies the write destination VVOL and the write destination virtual area on the basis of the access destination information included in the write command.
(a3) The pool management program 305 stores data to be written in response to the write command in the cache memory area. At this time, the pool management program 305 may respond to the host computer 101 as write completion.
(a4) The pool management program 305 determines whether the page is allocated to the write destination virtual area specified in the above item (a2), or not, with reference to the pool management table 302.
(a5) If the result of determination in the above item (a4) is positive, the pool management program 305 writes data to be written within the cache memory area into the page allocated to the write destination virtual area.
(a6) If the result of determination in the above item (a4) is negative, the pool management program 305 specifies the unused page which is not allocated to any virtual area in the pool associated with the write destination VVOL on the basis of the VOL management table 304 and the pool management table 302. In this example, the pool management program 305 may specify the unused page from the LDEV belonging to a tier as higher as possible.
(a7) The pool management program 305 associates the page specified in the item (a6) with the write destination virtual area. Specifically, the pool management program 305 writes the head LBA and the terminal LBA in the write destination virtual area corresponding to the allocated page into the LDEV access frequency 506 of the pool management table 302.
(a8) The pool management program 305 writes the data to be written within the cache memory area into the page specified in the above item (a6). In this stage, the pool management program 305 may respond to the host computer 101 as write completion.
(a9) In the above item (a5) or (a8), the pool management program 305 updates the access frequency to the data write destination page in the pool management table 302. Also, in association with this operation, the pool management program 305 updates the access frequency to the LDEV having that page in the pool management table 302.
(B) The pool management program 305 conducts the read processing including the following processing (b1) to (b8).
(b1) The pool management program 305 receives the read command from the host computer 101.
(b2) The pool management program 305 specifies the read source VVOL and the read source virtual area on the basis of the access destination information included in the read command.
(b3) The pool management program 305 determines whether the data to be read remains in the cache memory area, or not.
(b4) If the result of determination in the above item (b3) is positive, the pool management program 305 transmits the data to be read within the cache memory area to the host computer 101. In this case, the access frequency (and the access frequency to the LDEV having that page) to the page allocated to the read source virtual area is not updated.
(b5) If the result of determination in the above item (b3) is negative, the pool management program 305 determines whether the page is allocated to the read source virtual area specified in the above item (b2), or not, with reference to the pool management table 302.
(b6) If the result of determination in the above item (b5) is negative, the pool management program 305 transmits the given data (for example, error response) to the host computer 101.
(b7) If the result of determination in the above item (b5) is positive, the pool management program 305 reads the data from the page allocated to the read source virtual area, and writes the data into the cache memory area. Then, the pool management program 305 transmits the data within the cache memory area to the host computer 101.
(b8) The pool management program 305 updates the access frequency to the data write destination page in the pool management table 302. Also, in association with this operation, the program updates the access frequency to the LDEV having that page in the pool management table 302.

(C) The pool management program 305 conducts an LDEV adding process (pool expansion) including the following processing (c1) to (c3). After (c3), (E) a rebalancing process to be described later may be conducted.

(c1) The pool management program 305 allocates the LDEV ID to the LDEV to be added.

(c2) The pool management program 305 divides the LDEV to be added into pages, and allocates page IDs to the respective pages obtained by division.

(c3) The pool management program 305 adds information (ID of the pool to which the LDEV is added, LDEV ID allocated in the item (c1), and page ID allocated in the item (c2)) related to the LDEV to be added to the pool management table 302.

(D) The pool management program 305 conducts an LDEV deleting process (pool reduction) including the following processing (d1) and (d2).

(d1) The pool management program 305 executes the rebalancing process for allowing the data within all of the use pages (page allocated to any virtual area) within the LDEV to be deleted to migrate to another LDEV.

(d2) The pool management program 305 deletes information related to the LDEV to be deleted from the pool management table 302.

(E) The pool management program 305 can conduct the rebalancing process including the following processing (e1) to (e4). In this case, for example, the memory 243 may have the tier definition management table 804 to be described later, provided in the management computer 201. This balancing process may be regularly conducted. Also, the rebalancing process may be applied to the rebalancing process in the above item (d1).

(e1) The pool management program 305 specifies the page in which data improperly arranged is stored as a migration source page. Specifically, the pool management program 305 searches a page in which the access frequency to the page is not included in the access frequency range of the tier having that page from the pool management table 302. The migration source page is a use page within the LDEV to be deleted in the rebalancing process of the above item (d1).

(e2) The pool management program 305 specifies the tier corresponding to the access frequency range to which the access frequency limit 505 of the migration source page found in the above item (e1) belongs.

(e3) The pool management program 305 specifies an unused page from the tier specified in the above item (e2). The unused page specified in this situation is a migration destination page.

(e4) The pool management program 305 allows data within the migration source page specified in the above item (e1) to migrate to the migration destination page specified in the above item (e3). Also, the pool management program 305 allocates the migration destination page to the virtual area to which the migration source page is allocated instead of the migration source page, and updates the pool management table 302.

FIGS. 5 and 6 illustrate the VVOL management table 801. The VVOL management table 801 has information related to the VVOL. The VM using the respective VVOL, the required performances required for the respective VVOL, and the pool that provides the page to the virtual areas of the respective VVOL are found from the VVOL management table 801.

The VVOL management table 801 has the following information for each VVOL. A VVOL ID 901 is information for identifying the VVOL. A sub-system ID 902 is information for identifying the storage devices 102 having the VVOL. A capacity 903 is information representing the capacity of the VVOL. A use capacity 904 is information representing a total storage capacity of the virtual area to which the page is allocated. A pool ID 905 is information for identifying the pool associated with the VVOL. A port ID 906 is information for identifying a storage port associated with the VVOL. A host ID 907 is information for identifying the host computer 101 to which the VVOL is allocated. A VM ID 908 is information for identifying the VM to which the VVOL is allocated. A VM operating time 909 is information representing a time zone during which the VM operates. A required performance 910 is information representing a response performance required when the VM accesses to the volume.

An allowable down time 911 is a down time allowable for the VM. The down time in this example includes not only a time when the VM cannot access to the volume at all, but also a time when a state in which the response performance is slower than the required performance is continued. An allowable cost 912 is a cost accepted for a countermeasure against a state improvement in the VM. Not a specific amount of money, but a relative value such as high, middle, or low may be written. A time 913 is information representing a measurement time zone. A VM performance 914 is information representing the response performance of the VM. A VVOL performance 915 is information representing the response performance of the VVOL. An access distribution 916 is information representing the total number of pages falling within the access frequency range, for each access frequency range. Referring to FIG. 6, in the access frequency range, a number range of the IOPS is sectioned every 250, and counted. However, the number range is not limited to this configuration if the number range is an integer of 1 or more. The state monitoring program 810 can calculate an access distribution for each VVOL on the basis of the pool management table 302 provided in the storage system 103. A new page allocation capacity 917 is information representing a total page allocation capacity newly allocated to the VVOL in the measurement time zone. A port load 918 is information representing a load exerted on the port used for accessing to the VVOL in the measurement time zone.

In this example, the required performance 910 is a threshold value compared with the VM performance 914. In the required performance 910, a response time to be met when the VM accesses to data stored in the storage device is registered. The response time is, for example, a time length since the VM issues the access command designating the VVOL until the VM receives a response thereto. The VVOL performance 915 is, for example, a means response time of the VVOL. The response time is, for example, a time length since the access command designating the VVOL is input to the storage device 102 until the response is returned to the host computer 101.

The required performance 910 is determined by, for example, a manager taking a use status of the VM into account. A mean response time of the VVOL is calculated by, for example, the VVOL management table 801 through the following Expression (1), and stored in the VVOL management table 801.

(mean response time of VVOL)=(sum of products of access frequencies and response times in all pages allocated to VVOL)/(sum of access frequencies in all pages allocated to VVOL)  (1)]

where a unit of the access frequency is, for example, IOPS.

For example, it is assumed that pages 1 to 6 are allocated to the VVOL. In each of pages 1 to 6, "tier to which the page belongs/access speed [msec] in the tier/access frequency [IOPS] to page] are set as follows. Page 1: higher-level tier (SSD)/1/100, page 2: middle-level tier (SAS)/10/50, page 3: middle-level tier (SAS)/10/20, page 4: lower-level tier (SATA)/20/10, page 5: lower-level tier (SATA)/20/5, and page 6: lower-level tier (SATA)/20/0.

In this case, according to Expression (1), a mean response time K of the VVOL is K=(100×1+50×10+20×10+10×20+5×20+0×20)/(100+50+20+10+15)=about 5.37 ms. The access speed is acquired from the tier definition management table 804 which will be described later.

The mean response time (performance) thus obtained is compared with the required response performance of the VVOL which is acquired from the required performance 910. Because a time required for data transfer between the host and the storage device is not included in the VVOL performance 915, the required response performance of the VVOL is calculated taking a data transfer time appropriate to the environment into account. For example, it is assumed that the required performance of one VM is designated as 5 ms. When 20% of the time length since the VM issues the access command to the VVOL until the host receives the response thereto is required as a time necessary for data transfer between the VM and the storage device, a response time L of the expected VVOL is represented by the following expression. L=5 ms×(100−20)÷100=4 ms It is assumed that the time since the VM issues the access command to the VVOL until the host computer 101 receives the response thereto is 8 ms. If the means response time registered in the VVOL performance 915 is smaller than 4 ms, the response time expected for the VVOL is satisfied, but it is determined that the data transfer between the VM and the storage device is delayed. On the other hand, if the means response time registered in the VVOL performance 915 is larger than 4 ms, it is determined that the response time per se of the VVOL does not satisfy an expected required response performance.

The required performance 910, the allowable down time 911, and the allowable cost 912 may be stored in the VVOL management table 801 by the controller 251 by receiving setting of the manager from the input when the VM is created by the hypervisor as a trigger. Also, as in the above example, the response time expected for the VVOL may be set to a value obtained by subtracting a data transfer time between the VM and the storage device as a specified value from the required performance 910 instead of the value of a given rate of the required performance 910 (response time) of the VW. Also, the response time expected for the VVOL may be stored as an added entry (not shown) of the VVOL management table 801.

FIG. 7 illustrates the pool capacity consumption trend management table 802. The pool capacity consumption trend management table 802 has information related to the use trendy of the pools provided in the storage system 103.

A pool ID 1101 is information for identifying the pool. A sub-system ID 1102 is information for identifying the storage devices 102 having the pool. A time 1103 is information representing a measurement time zone. A new page allocation capacity 1104 is information representing a total capacity of the page newly allocated to the measurement time zone.

FIG. 8 illustrates the port load trend management table 803. The port load trend management table 803 has information related to the use trend of the port provided in the storage devices 102. A port ID 1201 is information for identifying the ports.

A maximum allowable load 1202 is information representing a maximum value of a load allowable by the port. A sub-system ID 1203 is information for identifying the storage devices 102 having the port. A time 1204 is information representing the measurement time zone. A port load 1205 is information representing the load exerted on the port in the measurement time zone.

FIG. 9 illustrates the tier definition management table 804. The tier definition table 804 represents the definition of the tier. The type of the LDEV configuring the respective tiers, the performance of the LDEV, and the maximum access frequency to the LDEV are found from the tier definition table 804.

A tier level 1301 is information representing a level of the tiers. The "level of the tiers" is a numerical value representing a height of the tier. In this embodiment, the tier is higher as the numerical value of the tier is smaller. An LDEV type 1302 is information representing the type of the LDEV belonging to the tier. A speed 1303 is information representing a speed of the access to the tier. A maximum access frequency 1304 is information representing a maximum value of the access frequencies corresponding to the tiers. A cost 1305 is information representing a bit cost of the volume belonging to the tier. In FIG. 9, a value when the bit cost of the SATA is 1 is stored.

The access frequency ranges of the respective tiers are represented by the maximum access frequencies of the respective tiers. In an example of FIG. 9, an access frequency range of the higher-level tier (SSD) is 25000 to 2500 (except for 2500). An access frequency range of the lower-level tier (SATA) is 1250 to 0.

FIG. 10 illustrates the task execution authority management table 806. The task execution authority management table 806 represents a management authority necessary for executing a task such as operation on the storage devices 102 (storage system 103) or the host computer 101.

A task type 1501 is information for identifying the operation on the host computer and the storage device. An executable management authority 1502 is information representing a management authority necessary for executing the task. In an example of FIG. 10, it is found that the storage management authority is necessary for execution of the volume migration and the pool authority, and the server management authority is necessary for execution of the VM migration. The task execution authority may be stored in the task execution authority management table 806 by a CPU of the management computer 201 by receiving the setting of the manager from the input unit, or the management computer 201 may be provided with the task execution authority management table 806 in advance.

FIG. 11 illustrates the creating countermeasure management table 807. The creating countermeasure management table 807 illustrates one or more created countermeasures, and effects thereof. The tasks configuring the respective countermeasures, and the effects obtained when executing the countermeasures are found from the creating countermeasure management table 807.

A countermeasure ID 1601 is information for identifying the countermeasures. A task ID 1602 is information for identifying the tasks configuring the countermeasures. A task type 1603 is information representing the type of tasks. A task parameter 1604 is information for identifying parameters necessary for execution of the tasks. For example, if the task is the volume migration, identification information on the migrating VVOL, identification information on the pool used before the migrating VVOL migrates, and the identification information of the migration destination pool are registered therein. If the task is the pool expansion, identification information on LDEV addition target pools, and added LDEV type/capacity are registered therein.

A task execution authority 1605 is information representing the management authority necessary for execution of the tasks. A response performance 1606 is information representing the VVOL performance (response time) after the countermeasure has been executed. For example, if the countermeasure is configured to improve the response performance when the performance (response time) of the VVOL1 is degraded, the performance (response time) of the VVOL1 after the countermeasure has been executed is registered therein. An execution time 1607 is information representing a time necessary for execution of the countermeasure. An execution cost 1608 is information representing the cost necessary for execution of the countermeasure. An influenced VM ID 1609 is information representing the VM that is likely to be affected by the countermeasure during the execution of the countermeasure. An execution recommendation level 1610 is information representing an execution recommendation level of the countermeasure. A method for calculating the execution recommendation level will be described with reference to FIG. 16. An automatic execution propriety 1611 is information representing whether the countermeasure can be automatically executed, or not. An automatic execution last 1612 is information representing a last time when the countermeasure can be automatically executed.

In this example, the automatic execution means that one or more tasks having a dependency relationship on an execution order are executed as a series of processing by a specific authority. That the automatic execution is allowed represents that a control for automatically executing the series of processing is allowed by accepting the operation of the manager having the specific authority through the management computer 201.

A process for determining whether the countermeasure can be automatically executed, or not, and a process for determining whether it is a last time when the countermeasure can be automatically executed, or not, will be described with reference to FIGS. 17 and 18.

FIG. 12 illustrates the automatic execution determination management table 808. A condition (policy) for determining whether the automatic execution of the respective countermeasures managed in the automatic execution determination management table 808 illustrated in FIG. 11 is executed, or not, is registered in the automatic execution determination management table 808.

In the operation management of a large-scaled system, when the system configuration is changed, it is usual to take an approval of a higher-level manager who uniformly grasps and manages the overall configuration. However, if the higher-level manager must study and approve all of the countermeasures, for example, including those affecting only resources low in the degree of importance, objects to be managed become enormous, resulting in an increase in useless management costs. Also, when plural tasks is included in the countermeasure, if the managers each having the task execution authority are different from each other for each of the tasks, the study and approval operation of the countermeasure becomes cumbersome. Also, even if the storage manager has an execution authority as the task type, if there is a VM that operates in a scheduled countermeasure execution time, the business may be likely to be affected by the VM. Resultantly, in real operation, the study and approval of the countermeasure by another manager (server manager or higher-level manager) involved with a system operations management are also required in actual circumstances.

In order to reduce the above management load, for example, the countermeasures relatively low in an influence on the overall system, or the countermeasures low in the costs are allowed to be automatically executed on the basis of a predetermined policy without depending on the authority of the higher-level manager or another manager. A condition under which the countermeasures are allowed to be automatically executed is found from the automatic execution determination management table 808.

An automatic execution determination attribute 1701 is information representing an attribute for determining whether the automatic execution is allowed, or not. A determination parameter 1702 is information representing a value of the attribute indicative of the automatic execution determination attribute when the automatic execution is allowed. In an example of FIG. 12, the following entry is registered as the automatic execution determination attribute. The "use resource" is a resource used in the countermeasure. If the use resource is a resource of storage X, the automatic execution is enabled. Also, if the resource uses VM X, because the VM X that conducts an important business may be affected by the resource, the automatic execution is disabled. The "execution authority" is necessary for execution of the tasks configuring the countermeasure. If the storage management authority is unnecessary, the automatic execution is enabled. The "influenced VM number" is the number of VM likely to be affected by the execution of the countermeasure such that the response performance is degraded. If the number of influenced VM is five or lower, the automatic execution is enabled without inquiring of the server manager. The "execution time" is a time necessary for execution of the countermeasure. If the countermeasure can be executed within two hours, because the influence on the system is relatively small, the automatic execution is enabled without depending on the authority of the higher-level manager. The "execution cost" is a cost necessary for execution of the countermeasure. If the cost is $1000 or lower, the automatic execution is enabled without depending on the authority of the higher-level manager.

The attributes described in the first embodiment are exemplary, and the present invention is not limited to only the described attributes. For example, the countermeasure creating program 811 may create the automatic execution determination management table 808, for example, by accepting the setting of the manager from the input unit.

In the first embodiment, an example in which the automatic execution is allowed only when all of the determination conditions registered in the automatic execution determination management table 808 are satisfied will be described. For instance, in an example of FIG. 12, the automatic execution is allowed by only the countermeasures satisfying all of the following conditions. The resource used for the countermeasure is storage 1, and the resource used for the countermeasure is not used by the VM X. The server management authority is unnecessary for execution of all the tasks configuring the countermeasure. The number of VM affected by the countermeasure is five or lower. A time required for execution of the countermeasure is two hours or shorter, and the necessary costs are $1000.

The automatic execution is not allowed only when all of the automatic execution determination conditions are satisfied, but when the priority is given to the automatic execution conditions, and a given number of automatic execution conditions higher in priority are satisfied, the countermeasure may be automatically executed even if the automatic execution conditions lower in the priority are not satisfied.

Subsequently, the state monitoring program 810 and the countermeasure creating program 811 on the storage resource 211 will be described.

The state monitoring program 810 collects the use trend information on the VVOL, the pools, and the ports, and the performance information on the VM every given time, or when receiving the information collection request from the external as a trigger, and records those information in the VVOL management table 801, the pool capacity consumption trend management table 802, and the port load trend management table 803.

(F) The state monitoring program 810 executes the following processing, for example, every one hour.

(f1) The state monitoring program 810 acquires the information registered in the pool management table 302 from the storage devices 102.

(f2) The state monitoring program 810 calculates the use capacity, the access distribution, and the new page allocation capacity for each VVOL on the basis of the information acquired in the item (f1), and adds the calculation results and the measurement time information to the use capacity 904, the VVOL performance 915, the access distribution 916, the new page allocation capacity 917, and the time 912 of the VVOL management table 801 for update.

(f3) The state monitoring program 810 calculates the new page allocation capacity for each pool on the basis of the information acquired in the item (f1), and adds the calculation result and the measurement time information to the time 1103, the new page allocation capacity 1104, and the time 1103 of the pool capacity consumption trend management table 802 for update.

(f4) The state monitoring program 810 acquires a time length (VM performance) since the VM 111 issues the access command to the VVOL until the VM 111 receives a response thereto from the host computer 101. For example, when the VM 111 accesses to data stored in the storage devices 102, the VM 111 or the hypervisor 112 records a response time thereof therein in advance, and the state monitoring program 801 acquires the recording result. Then, the state monitoring program 810 records the acquired VM response performance information in the VM performance 914 of the VVOL management table 801.

(f5) The state monitoring program 810 acquires the port load information from the storage device 102. For example, a program on the memory 243 of the storage device 102 regularly records the load information on the port 241 and information on the VVOL accessed using that port in the memory 243 in advance, and the state monitoring program 810 acquires the recording results. Then, the state monitoring program 810 records the acquired port load information in the port load 918 of the VVOL management table 801.

(f6) The state monitoring program 810 calculates the port load information for each VVOL on the basis of the information acquired in the item (f5), and adds the calculation result and the measurement time information to the time 1204 and the port load 1205 of the port load trend management table 803 for update, and completes the processing.

The state monitoring program 810 further monitors whether an improper state is generated in the VM 111, or not. In this example, the improper state represents, for example, a state (VM response delay) in which the response performance when the VM accesses to data stored in the storage device is slower than the required response performance. Even in a case where the response performance is excessively fast, an excellent resource is uselessly allocated, and an unnecessary investment occurs. This can be dealt with as an improper state.

(G) The state monitoring program 810 monitors, for example, the state of the system in the following steps.

(g1) The state monitoring program 810 compares the required performance 910 of the VVOL management table with the VM performance 914. If a performance value registered in the VM performance 914 is larger (slower) than a required performance value, the state monitoring program 810 determines that the VM does not satisfy an expected performance, and implements an item (g2). On the contrary, if the performance value registered in the VM performance 914 is smaller (faster) than the required performance value, the state monitoring program 810 completes the processing. If the performance value registered in the VM performance 914 is too smaller than the required performance value, the state monitoring program 810 determines that the excellent resource is uselessly allocated, and may implement the item (g2).

(g2) Then, the state monitoring program 810 compares the required response performance of the VVOL obtained from the required performance 910 with the VVOL performance 915. If the value registered in the VVOL performance 915 exceeds (slower than) a given rate of the value registered in the required performance 910, the state monitoring program 810 outputs that the VM response delay is generated for a root cause that the VVOL response time falls below an expected one to the output unit as an alert. On the contrary, if the value registered in the VVOL performance 915 falls below the given rate of the value registered in the required performance 910, the state monitoring program 810 outputs that the VM response delay is generated for the root cause other than the VVOL response time delay to the output unit as the alert.

An RCA (root cause analysis) technique for specifying the root cause on the basis of event information such as a response delay alert may be used for specifying the root cause of the response delay. Also, in the following description of this embodiment, it is assumed that the response delay of the VM is generated mainly because of the VVOL. Otherwise, it is conceivable that the response delay is generated because of an overload of the storage port, the network, or the CPU of the host computer.

FIGS. 13 to 18 are flowcharts illustrating a flow of the countermeasure creating process. For example, the countermeasure creating program 811 executes the countermeasure creating process when receiving a countermeasure creation instruction. The countermeasure creation instruction may be issued by receiving an input from the manager when the alert is issued from a state monitoring program 809.

Figure 13:
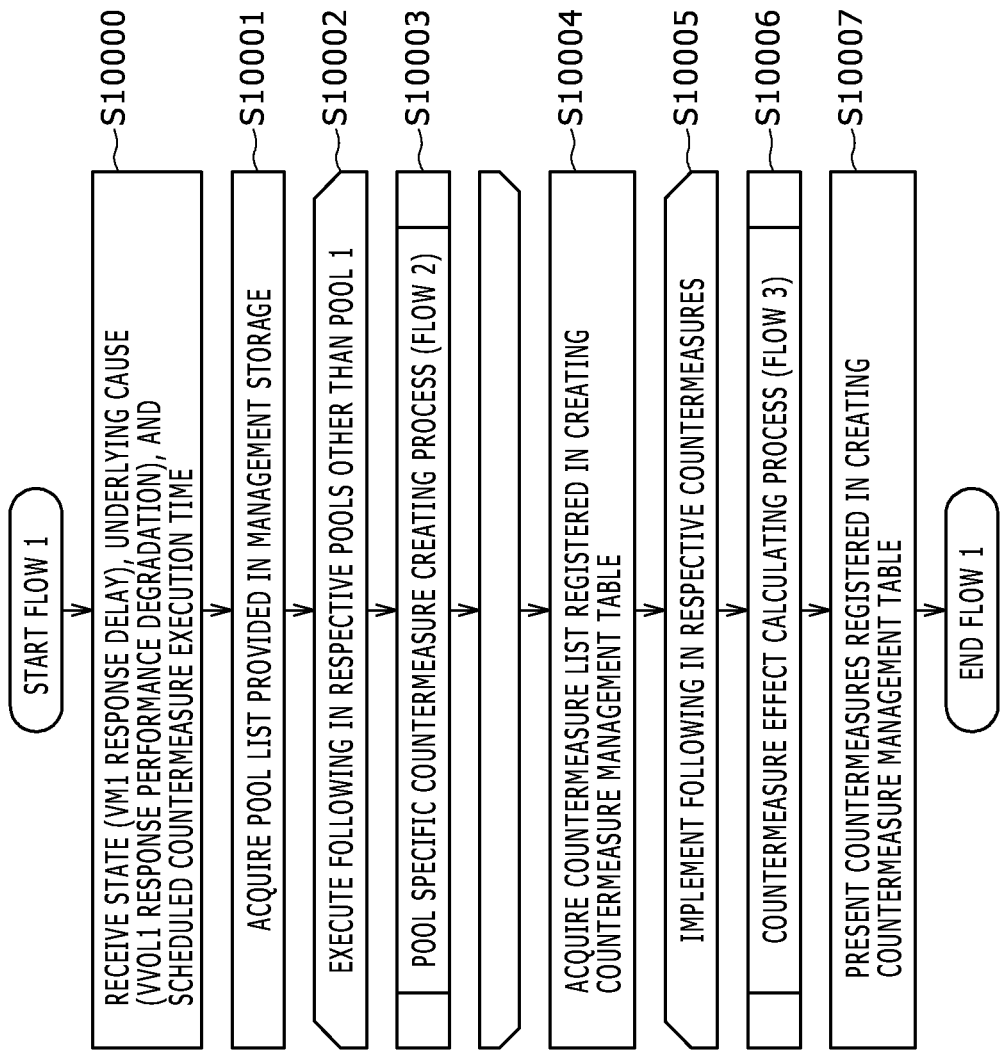
FIG. 13 is a flowchart of a countermeasure creating process according to the first embodiment.

FIG. 13 illustrates a processing flow for creating the countermeasure when the response delay is generated in the VM1, and its root cause is the VVOL1.

The countermeasure creating program 811 receives that a state which is a motivation of the countermeasure creation is the response delay of the VM1, that the root cause of the above state is the VVOL1, and a scheduled countermeasure execution time which is a scheduled time for the manager to execute the countermeasure, as the output results of the state monitoring program 810, and the contents of the countermeasure creation instruction (S10000).

Then, the countermeasure creating program 811 acquires information on a pool list provided in the storage system 103 managed by the host computer 101 from the storage system 103 (S10001). The countermeasure creating program 811 specifies the pool used by the VVOL1, and then executes the pool specific countermeasure creating process on pools except for the specified pool, that is, the respective pools which are migration destination candidates of the VVOL1, in the acquired pool list (S10002, S10003). The details of processing in S10003 will be described with reference to FIG. 14. Hereinafter, it is assumed that the pool used by the VVOL1 is a pool 1.

Then, the countermeasure creating program 811 acquires a countermeasure list registered by processing in S10003 with reference to the creating countermeasure management table 807 (S10004). The countermeasure creating program 811 executes the countermeasure effect calculating process on the respective countermeasures included in the acquired countermeasure list (S10005, S10006). The details of processing in S10005 will be described with reference to FIG. 15. Then, the countermeasure creating program 811 acquires the created countermeasure list from the creating countermeasure management table 807, outputs the acquired list to the output device, and completes the processing (S10007). Instead of the above step, the countermeasure creating program 811 may conduct the countermeasure effect calculating process before storing the created countermeasures in the creating countermeasure management table 807, and store the countermeasures together with the calculated results in the creating countermeasure management table 807, or output the countermeasures together with the calculated results directly to the output device.

Figure 14:
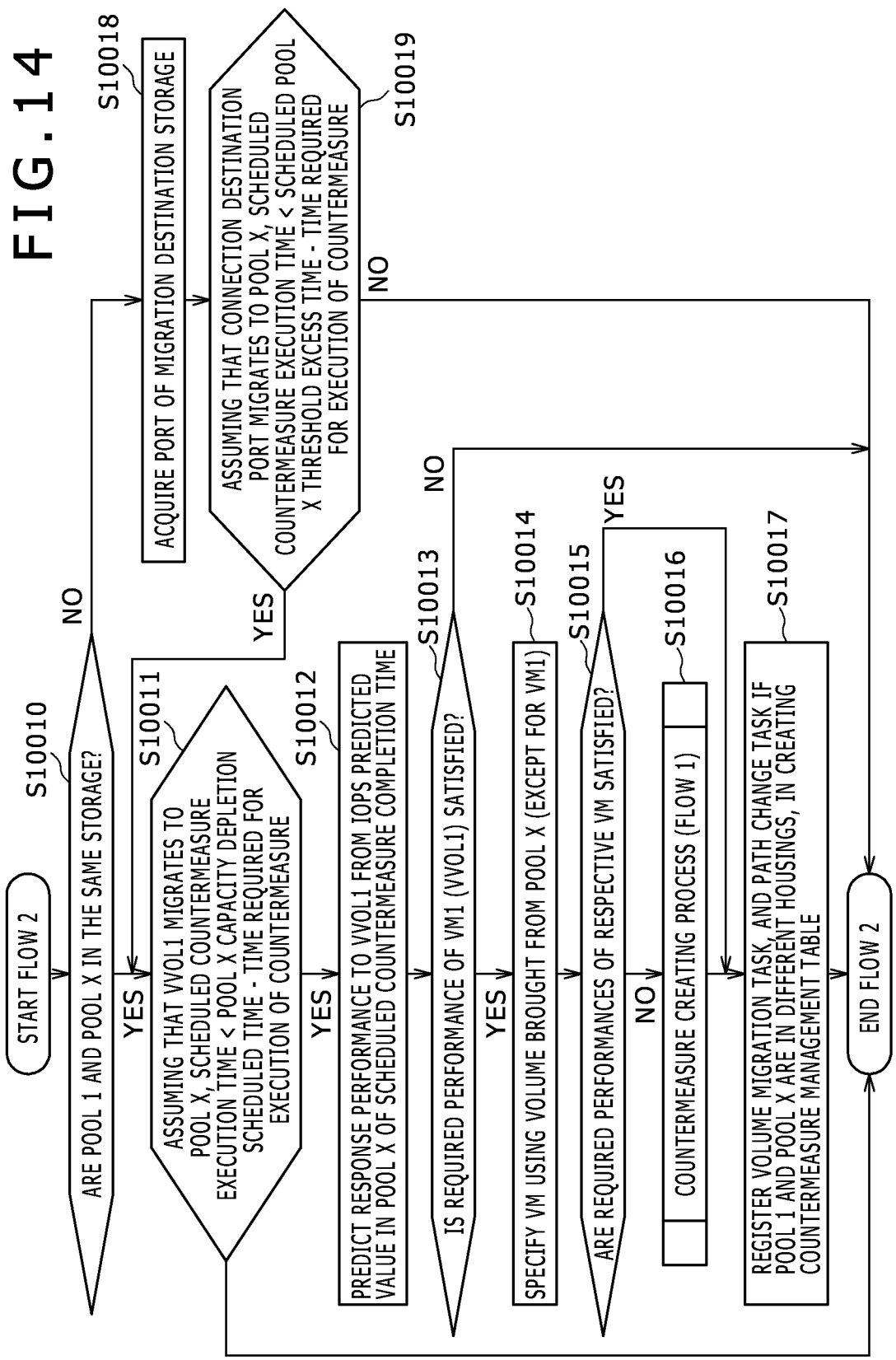
FIG. 14 is a flowchart of a pool specific countermeasure creating process according to the first embodiment.

Referring to FIG. 14, the details of the pool specific countermeasure creating process to be executed in S10003 of FIG. 13 will be described. FIG. 14 is a flowchart illustrating a flow of processing for creating a countermeasure including the tasks which migrates the VVOL to the pool selected in S10003. The countermeasure creating program 811 predicts whether the performance improvement is expected by migrating the VVOL to the pool selected in S10002, or not. If the performance improvement is expected, the countermeasure creating program 811 creates the countermeasure including the task for migrating the VVOL to the pool selected in S10002. In the following description, it is assumed that the pool selected as a pool to be processed in S10002 is a pool X.

The countermeasure creating program 811 determines whether the pool 1 and the pool X are pools provided by the same storage device 102, or not (S10010). If the determination in S10010 is negative, the countermeasure creating program 811 may change the storage port used for accessing to the VVOL1 from the VM1.

Specifically, the countermeasure creating program 811 changes the storage port used when the VM1 accesses to the VVOL1 from a port of the storage device having the pool 1 to a port of the storage device having the pool X. If the storage port is not changed, the countermeasure creating program 811 must access to the storage device having the pool X through the storage device having the pool 1. As a result, the performance is likely to be slower than that when accessing directly to the storage device. Because the above port must be naturally connected from the host computer 101 in which the VM1 is operating, if the port is not connected from the host computer 101 in which the VM1 is operating, the countermeasure creating program 811 needs to implement a process of changing the host computer per se in which the VM1 is operated, or newly connect the host computer 101 and the storage device. In the first embodiment, it is assumed that the VM1 and the above port are connected to each other.

The countermeasure creating program 811 specifies the port of the storage having the pool X (S10018). Hereinafter, it is assumed that the port of the storage specified in S10018 is the port X. Then, the countermeasure creating program 811 determines whether a scheduled countermeasure execution time is before or after a value obtained by subtracting a time required for the countermeasure from a scheduled threshold excess time, assuming that the storage port used when the VM1 accesses to the VVOL1 is changed from the portion of the storage device having the pool 1 to the port of the storage device having the pool X (S10019).

The scheduled threshold excess time of the port X is obtained by, for example, the countermeasure creating program 811 as follows.
(1) The countermeasure creating program 811 acquires a port load history of the port 1 used by the VVOL1 from the VVOL management table 801, and calculates a load trend expression of the port 1 by the VVOL1. For example, the countermeasure creating program 811 can use a technique of regression analysis.
(2) The first plate member 811 acquires the port load trend of the port X, and calculates the load trend expression of the port X according to the port load trend management table 803.
(3) The countermeasure creating program 811 calculates a time during which the load exerted on the port X exceeds a maximum allowable load of the port X registered in the port load trend management table 803, through the load trend expression of the port 1 by the VVOL1 calculated in the item (1), and the load trend expression of the port X calculated in the item (2).

For example, it is assumed that the VVOL1 is expressed by an expression of Y=2T+2 (T: time) with a trend that the load exerted on the port 1 monotonically increases. Also, it is assumed that the VVOL1 is expressed by an expression of Y=2T+10 (T: time) with a trend that the load exerted on the port X monotonically increases.

When the port used by the VVOL1 changes from the port 1 to the port X, the predicted load increase trend of the port X is expressed by the following expression.

$$W=(2T+2)+(2T+10)=4T+12$$

The countermeasure creating program 811 calculates the time during which the load exerted on the port X exceeds the port maximum allowable load, from the maximum allowable load of the port X which is registered in the port load trend management table 803. For example, it is assumed that the maximum allowable load of the port X is 40 according to the port load trend management table 803. Because the load increase trend of the port X is predicted as W=4T+12, T in which a value of W exceeds 40 is 7. For that reason, seven hours after the present time can be calculated as the time during which the load exerted on the port X exceeds the port maximum allowable load. An example of a method for calculating a countermeasure execution time will be described in S10030 of FIG. 15. If the determination in S10010 is positive, because a change in the storage port is unnecessary, processing in S10018 and S10019 is omitted.

The countermeasure creating program 811 determines whether the scheduled countermeasure execution time is before a value obtained by subtracting the countermeasure execution time from a scheduled capacity depletion time of the pool X, or not, assuming that the VVOL1 migrates to the pool X (S10011). The scheduled capacity depletion time is obtained by, for example, the countermeasure creating program 811 through a following method.

(1) The countermeasure creating program 811 acquires a new page allocation capacity trend of the pool 1 used by the VVOL1, and calculates a new page allocation trend expression of the pool 1 per unit time by the VVOL1.

(2) The countermeasure creating program 811 acquires a pool consumption trend of the pool X from the pool capacity consumption trend management table 802, and calculates a pool capacity consumption trend expression of the pool X per unit time.

(3) The countermeasure creating program 811 calculates a time until an unused capacity of the pool X is depleted through the pool capacity consumption trend expression of the pool 1 per unit time by the VVOL1 which is acquired in the item (1), and the pool capacity consumption trend expression of the pool X per unit time which is acquired in the item (2).

In order to prevent a pool capacity from being depleted as soon as the countermeasure is completed, or the port load from exceeding the maximum allowable capacity, it may be determined that the countermeasure is improper unless a given margin is provided when comparing the scheduled countermeasure execution time with a value obtained by subtracting the countermeasure execution time from the scheduled threshold excess time (or the scheduled capacity depletion time of the pool X) in S10019 and S10011.

Also, the scheduled capacity depletion time of the pool X and the scheduled countermeasure execution time are compared with each other to conduct the determination in S1011. Alternatively, not the time but a remaining capacity of the pool X at the scheduled countermeasure execution time may be predicted, and it may be determined that the countermeasure is improper unless the remaining capacity is sufficient. Also, for example, there is a case in which the number of days during which the effects (performance) obtained by the countermeasure execution are to be maintained is determined in advance such that an HDD is delivered after three days, the performance is to be maintained for only three days, and thereafter a fundamental countermeasure is implemented with the use of the delivered HDD. In this case, a designation of the number of days during which the effects are to be maintained by the manager is accepted by the input unit, and the countermeasure may be determined to be improper unless the countermeasure withstands the number of days. Also, in the description of S10019, a case in which the port load has a monotonic increase trend is exemplified. When the load exerted on the port X exceeds the maximum allowable load with the change of the port even if the port load has no monotonic increase trend, it may be determined that a change in the use of the port is improper.

Subsequently, the countermeasure creating program 811 predicts the response performance when accessing to the VVOL1 assuming that the VVOL1 migrates to the pool X (S10012). The response performance when accessing to the VVOL1 is, for example, to acquire an access distribution history of the VVOL1 from the VVOL management table 801, calculate the access distribution of the pool X in the scheduled countermeasure execution time, and calculate a predicted value of the VVOL performance according to the calculated access distribution. A method of calculating the VVOL performance from the access distribution may be configured by, for example, the method disclosed in Patent Literature 2.

Then, the countermeasure creating program 811 determines whether the response performance calculated in S10012 satisfies the required response performance of the VVOL1 which is obtained from the required performance 910 of the VM1, or not (S10013). If the determination in S10013 is negative, the countermeasure creating program 811 completes the processing in a flow 2. If the determination in S10013 is positive, the countermeasure creating program 811 specifies the VVOL already brought from the pool X and the VM using that VVOL on the basis of the VVOL management table 801 (S10014).

When it is assumed that the VM1 migrates to the pool X, the countermeasure creating program 811 determines whether the VVOL (and VM) specified in S10014 satisfies the required performance, or not (S10015). In this processing, the countermeasure creating program 811 calculates the response performance of the VVOL brought from the pool X according to the access distribution to the pool X which is calculated in S10012, and compares the calculation result with the required response performance of the VVOL which is obtained from the required performance 910 of the VVOL management table 801, and conducts the determination.

If the determination in S10015 is negative, when it is assumed that the VVOL determined not to satisfy the required performance is VVOL Y, and the VM to which the VVOL Y is allocated is VM Y, the countermeasure creating program 811 recursively executes a countermeasure (task) creating process in which a state to be improved is a response delay of the VM Y, the root cause is the VVOL Y, and the scheduled countermeasure execution time is the scheduled countermeasure execution time accepted in S100000 (S10016). If the determination in S10015 is positive, the processing in S10016 is omitted.

S10019 of the countermeasure (task) creating process for improving the access performance to the VVOL Y, and the processing in S10011 are conducted assuming that the countermeasure for improving the access performance to the VVOL1 is implemented. That is, when the storage pool for accessing to the VVOL1 is changed in the countermeasure creating process of the VVOL1, the countermeasure creating program 811 implements S10019 of the pool specific countermeasure creating process for the VVOL Y, assuming that the port load of the VVOL1 is added to the port X (conversely, the load of the port 1 is reduced as large as the VVOL1 migrates). When the VVOL1 migrates to the pool X in the countermeasure creating process of the VVOL1, the countermeasure creating program 811 implements S10011 of the pool specific countermeasure creating process for the VVOL Y, assuming that the capacity consumption trend of the VVOL1 is added to the pool X (conversely, the page capacity consumed in the pool 1 becomes as small as the VVOL1 migrates).

Then, the countermeasure creating program 811 registers the created countermeasure in the creating countermeasure management table 807, and completes the processing (S10017). For example, if it is determined that the determination in S10010 is positive, and the determination in S10015 is also positive, the first plate member 811 registers the task for migrating the VVOL1 from the pool 1 to the pool X as one countermeasure in the creating countermeasure management table 807. If it is determined that the determination in S10010 is negative, the countermeasure creating program 811 registers the countermeasure including the task for migrating the VVOL1 from the pool 1 to the pool X, and the task for changing the port used when the VM1 accesses to the VVOL1 to the port X in the creating countermeasure management table 807. In this situation, the countermeasure creating program 811 registers the task execution authority 1605 on the basis of the task execution authority management table 806 according to the type of task to be registered, and registers the predicted performance calculated in S10012 in the response performance 1606.

If there is plural VVOL whose performance is likely to be changed by the countermeasure, the countermeasure creating program 811 may register the predicted performances of the respective VVOL. Also, the countermeasure creating program 811 may register the predicted performance of the VM taking a data transfer time between the VM and the storage into account, and the countermeasure creating program 811 may use the predicted performance of not VVOL but VM for determination in the subsequent processing. In FIG. 11, the countermeasure creating program 811 stores the predicted performance of the VM as the effects of the countermeasure.

With the above processing of FIGS. 13 and 14, the countermeasure creating program 811 can create the countermeasure when the performance delay occurs in the VM1, and its cause is a response performance delay of the VVOL1. The processing in FIGS. 13 and 14 is applied when the VVOL response delay is the root cause. If the root cause is, for example, the CPU in the host computer 101, the countermeasure creating program 811 may create the countermeasure against the VM migration that migrates the VM to another host computer 101 lower in the processor load.

Also, not only a countermeasure that allows the VVOL to migrate between the pools, but also a countermeasure that adds the LDEV to the pools (pool expansion) is conceivable as the countermeasures when the root cause is the VVOL. Therefore, the first plate member 811 may create such countermeasures. For example, the countermeasure creating program 811 calculates the LDEV capacities necessary for the respective tiers according to the access distribution of the respective VVOL managed by the VVOL management table.

Also, even if the countermeasure creating program 811 recursively implements the countermeasure (task) creating process in S10016, the VM that does not satisfy the required performance may continue to exist. In order to cope with this case, the largest number of implementing the countermeasure creating (task) process is determined in advance, and when the largest number of countermeasure (task) creating process is implemented, the processing may be stopped. Also, a state that could be eliminated may be again produced while the countermeasure (task) creating process is recursively being executed. Similarly, in the case, the processing is stopped.

For example, the response delay of the VVOL3 (VM3) may occur when the response delay of the VVOL1 (VM1) is to be eliminated. Further, the response delay of the VVOL1 (VM1) may again occur when the response delay of the VVOL3 (VM3) is to be eliminated. In this situation, in a stage where the response delay is found (specifically, it is confirmed in the determination of S10015 whether the state that could be eliminated in the past is again produced, or not), and the countermeasure creating process is ceased. In those cases, the countermeasure creating program 811 may not create and output the countermeasure, or even if the countermeasure is executed, the countermeasure creating program 811 may not output a remaining state (state newly generated by the countermeasure) together with the countermeasure.

Also, the countermeasure creating program 811 may preferentially implement the countermeasure (task) creating process on the VM larger in a gap between the required performance and the present performance (predicted performance) among the VM that does not satisfy the required response performance. Even if the countermeasure creating process is midway stopped, the countermeasure creating program 811 can preferentially solve this situation.

Also, in the first embodiment, the countermeasure creating program 811 creates the countermeasure including a task that migrates the VVOL per se in which the response delay occurs to another pool. However, not the VVOL per se in which the response delay occurs, but the VVOL sharing the same pool migrates to another pool, to thereby eliminate the state. For that reason, the countermeasure creating program 811 may create, for example, the countermeasure for migrating the VVOL large in allocation page quantity from the higher tier to another pool.

Figure 15:
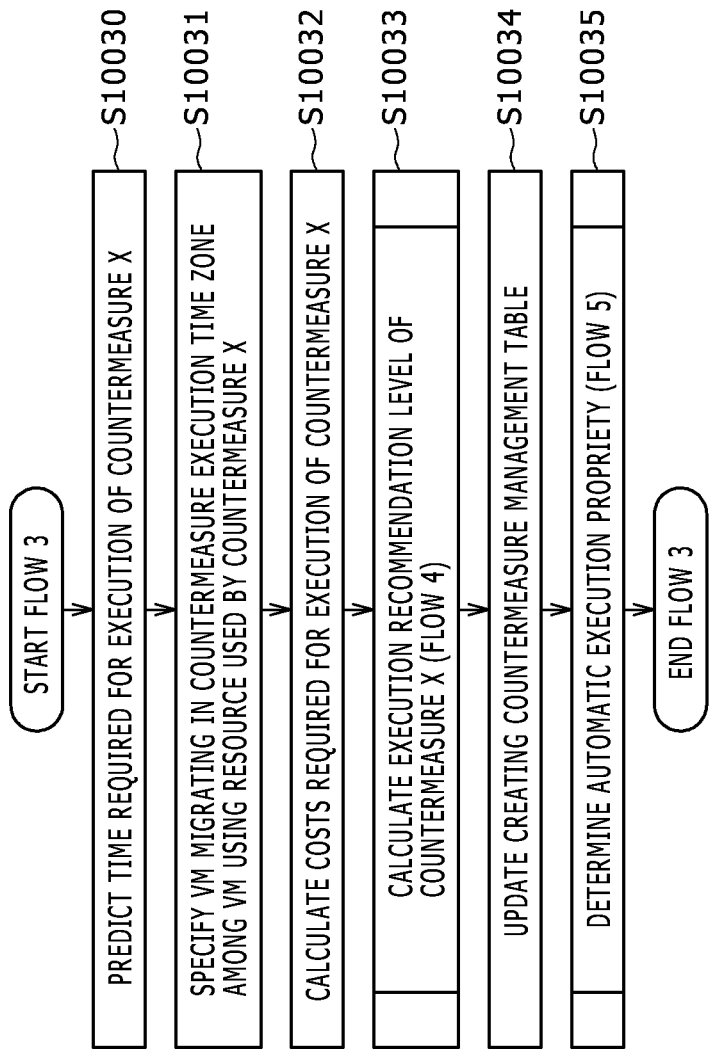
FIG. 15 is a flowchart of a countermeasure effect calculating process according to the first embodiment.

FIG. 15 illustrates the detail of the countermeasure effect calculating process which is executed in S10006 of FIG. 13. FIG. 15 is a flowchart illustrating a flow of processing for calculating the effects (response performance, execution time, execution cost, and influenced VM number) of the countermeasure, the execution recommendation levels, the automatic execution propriety, and whether the automatic execution is last, for the respective countermeasures generated in S10002 and S10003. In the following description, it is assumed that the countermeasure selected as the countermeasure to be processed in S10005 is the countermeasure X. Also, the effects represent influences on the overall system when the countermeasure is executed.

The countermeasure creating program 811 predicts a time required to execute the countermeasure X (S10030). For example, the countermeasure creating program 811 calculates the execution time for each task configuring the countermeasure, and sets the execution time of the task requiring the longest time as a time necessary for execution of the countermeasure if the respective tasks can be executed in parallel. Then, the countermeasure creating program 811 calculates the sum of the execution time of all the tasks as the execution time of the countermeasure if the tasks need to be sequentially executed.

Also, as the execution time calculation method of the respective tasks, if the tasks are configured to allow a VVOL to migrate between the respective pools, the first plate member 811 calculates a time required for the migration with the use of past migration histories of the VVOL in question, and the VVOL other than the VVOL in question. For example, the countermeasure creating program 811 holds the capacity of the VVOL that has migrated in the past, the load information during migration (for example, the access frequency to the VVOL to be migrated, the access frequency to the migration source/migration destination pool, and the loads exerted on the processor 244 and the port 242), and the time taken for the migration as actual achievements in advance. The countermeasure creating program 811 compares the capacity of the VVOL to be migrated with the actual achievements to calculate a time required to migrate the VVOL between the pools.

Then, the countermeasure creating program 811 specifies the resource newly used by execution of the countermeasure X, and specifies the VM that operates in the countermeasure execution time zone among the VM using the specified resource. For example, if the countermeasure is configured to migrate the VVOL1 brought from the pool 1 to the pool 3, the countermeasure creating program 811 specifies the VVOL and the VM associated with the pool 3. In the example of FIG. 2, the VVOL3 associated with the pool 3, and the VM3 using the VVOL3 are specified. Then, the VM likely to be affected by the countermeasure is further specified from the specified VM because the VM operates in a time since the "scheduled countermeasure execution time" acquired in S10000 till the "scheduled countermeasure execution time+time required for execution of the countermeasure" (S10031).

Then, the countermeasure creating program 811 calculates the cost necessary to execute the countermeasure X (S10032). For example, in the countermeasure for adding the LDEV to the pool, the countermeasure creating program 811 may calculate the costs of the volume necessary for addition according to the capacity of the LDEV newly added to the pool, and the bit cost information corresponding to the type of LDEV.

Subsequently, the countermeasure creating program 811 calculates the execution recommendation level calculating process of the countermeasure X (S10033). The details of the execution recommendation level calculating process will be described with reference to FIG. 16.

The countermeasure creating program 811 registers information on the calculated time necessary for execution of the countermeasure, the number of VM operating in the scheduled countermeasure execution time zone, the costs necessary for execution of the countermeasure, and the execution recommendation level in the execution time 1607, the influence VM ID 1609, the execution cost 1608, and the execution recommendation level 1610 of the countermeasure X in the creating countermeasure management table 807 (S10034).

The countermeasure creating program 811 executes the automatic execution propriety determining process, and completes the processing (S10035). The details of processing in S10035 will be described with reference to FIG. 17.

Figure 16:
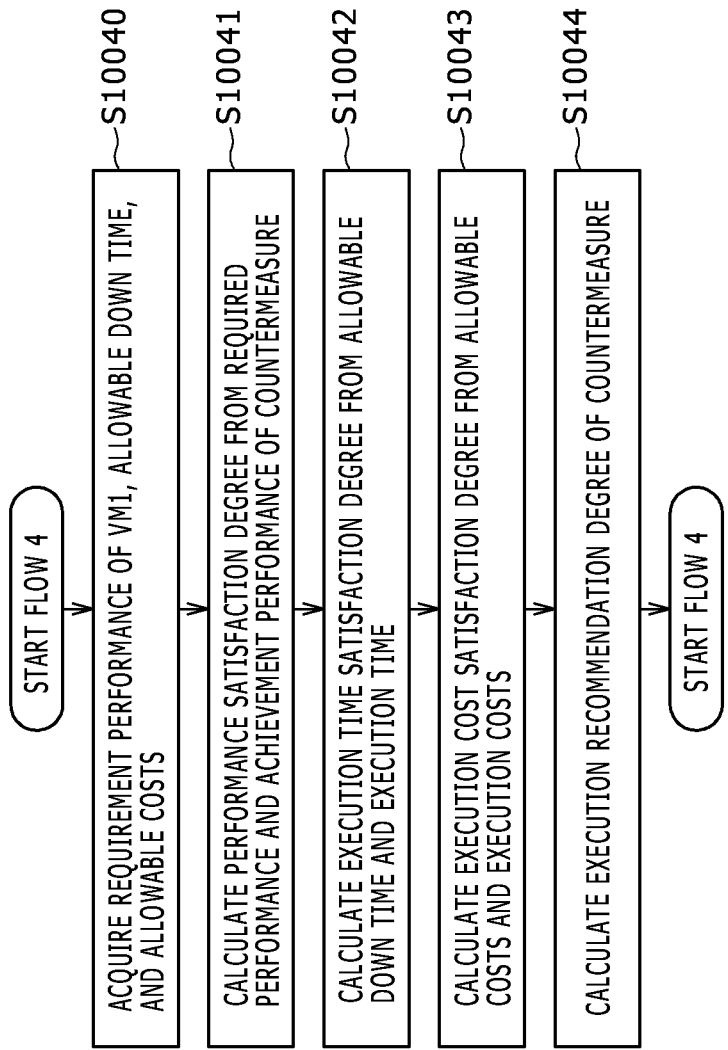
FIG. 16 is a flowchart of an execution recommendation level calculating process according to the first embodiment.

FIG. 16 illustrates the details of the execution recommendation level calculating process which is executed in S10032 of FIG. 15. FIG. 16 is a flowchart illustrating a flow of processing for calculating the execution recommendation level of the countermeasure X selected in S10005. The countermeasure creating program 811 can output the respective created countermeasures to the output device in order of increasingly satisfying the required/allowable requirements held in the VVOL management table 801, and present the created countermeasures to the manager.

The countermeasure creating program 811 acquires the required performance, the allowable down time, and the allowable cost of the VM1 using the VVOL1 from the VVOL management table 801 (S10040). The countermeasure creating program 811 calculates a performance satisfaction degree of the countermeasure X according to the required performance acquired in S10040, and the achieved performance when the countermeasure X is executed (S10041). Then, the countermeasure creating program 811 calculates the execution time satisfaction degree of the countermeasure X according to the allowable down time acquired in S10040, and the execution time of the countermeasure X (S10042). Then, the countermeasure creating program 811 calculates the execution cost satisfaction degree of the countermeasure X according to the allowable cost acquired in S1004, and the execution cost of the countermeasure X (S10043).

Subsequently, the countermeasure creating program 811 calculates the execution recommendation level of the countermeasure X with the use of the values calculated in S10041, S10042, and S10043 (S10044).

When the VVOL management table 801 is exemplified in FIGS. and 6, the required performance of the VM1 is 4 ms, the allowable down time is 5 hours, and the allowable cost is $10000. On the contrary, the response performance of the VM1 when the countermeasure 1 in FIG. 11 is executed is 3 ms, the time necessary for execution of the countermeasure is 4 hours, and the execution cost is $0. As a result, the performance satisfaction degree is set to $(3 \div 4) \times 100 = 75$. The execution time satisfaction degree is set to 100 because the countermeasure can be executed within the allowable down time. The countermeasure creating program 811 obtains the execution recommendation level of the countermeasure 1 as $(75+100+100) \div 3 =$ about 90.3 according to those values.

A state of the performance delay or over-provisioning occurs even if the performance is slower or faster, and therefore a difference between the required performance and the predicted performance is calculated in any cases. On the other hand, it is better as the execution time and the execution cost are shorter or smaller. For that reason, whether the execution time is shorter or longer than the allowable down time is calculated. If longer, how long the execution time is as compared with the allowable down time is calculated. Also, whether the execution cost is lower or higher than the allowable cost is calculated. If higher, how much the execution cost is as compared with the allowable cost is calculated. In the above example, because the execution time and the execution cost are shorter than the allowable down time and lower than the allowable cost, respectively, the satisfaction degree is calculated as 100. If the execution time is longer than the allowable down time, a difference between the allowable down time and the execution time is calculated. The same is applied to the execution cost and the allowable cost.

On the contrary, because the response performance of the VM when the countermeasure 2 in FIG. 11 is executed is 1 ms, the time required for execution of the countermeasure is 2 hours, and the execution cost is $5000, the performance satisfaction degree is set as $(1 \div 4) \times 100 = 25$. It is assumed that the execution time satisfaction degree is 100. It is assumed that the execution cost satisfaction degree is 100. As a result, the countermeasure creating program 811 obtains the execution recommendation level of the countermeasure 2 as $(25+100+100) \div 3 = 75$.

When the execution recommendation levels are compared between the countermeasure 1 and the countermeasure 2, the execution recommendation level of the countermeasure 1 is higher. Both of the countermeasures 1 and 2 satisfy the required/allowable requirements, but the countermeasure 2 excessively produces the performance as compared with the countermeasure 1, and the over-provisioning occurs. For that reason, the countermeasure 1 is lower in needlessness than the countermeasure 2, and the recommendation level of the countermeasure 1 becomes higher.

In this way, the required performance, the allowable cost, and the allowable down time are defined in advance. The execution recommendation level of the countermeasure is calculated according to the above information, the achieved performance of the countermeasure, the execution time, and the execution cost. As a result, the countermeasure can be selected according to the circumstance of the system management such that "the response performance is to be made faster even though the execution cost is somewhat increased", conversely "the response performance is modest since the execution cost is to be suppressed", or "a time necessary for the countermeasure is to be suppressed since the performance is minimally improved".

Figure 17:
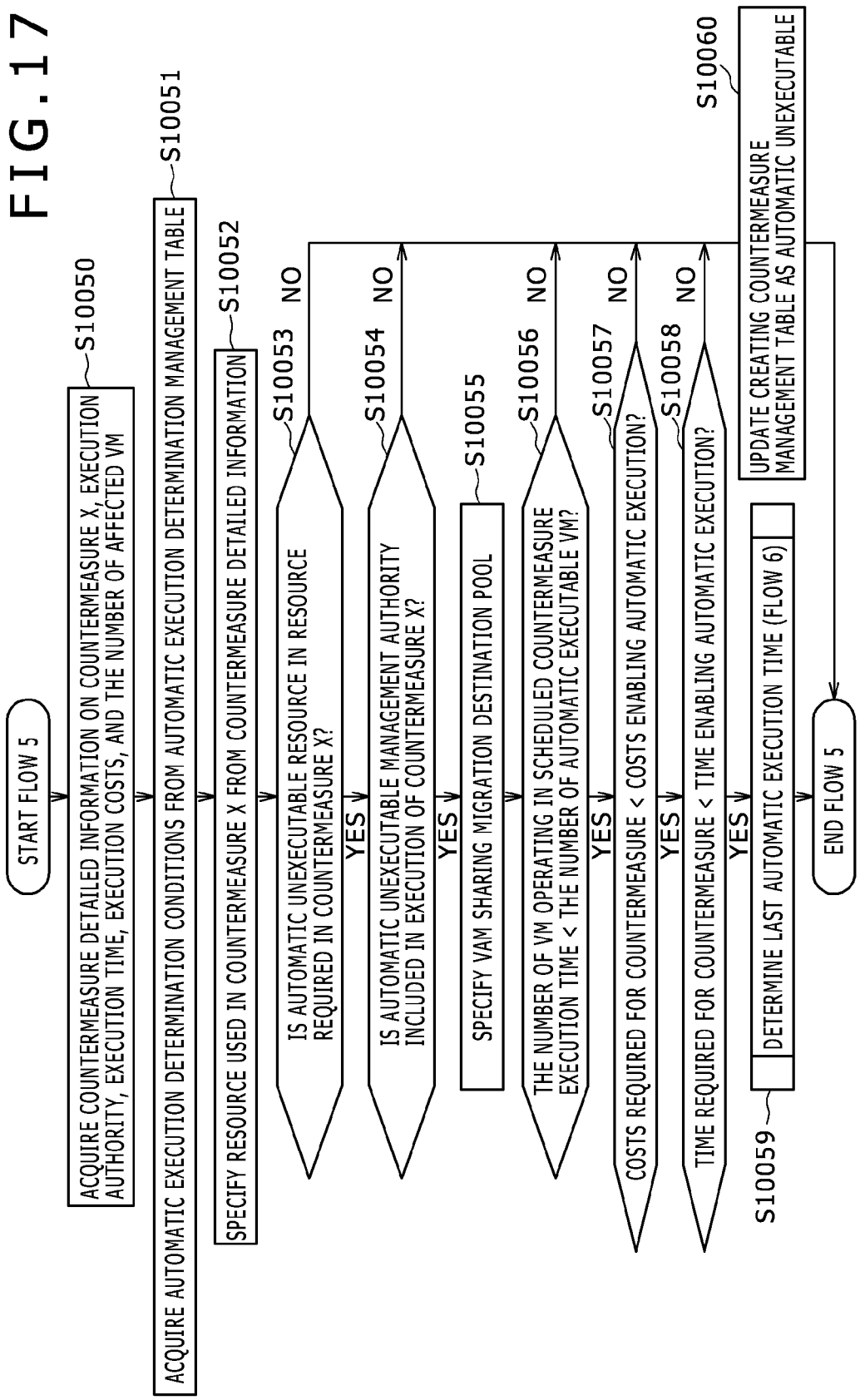
FIG. 17 illustrates a flowchart of an automatic execution propriety determining process according to the first embodiment.
Figure 18:
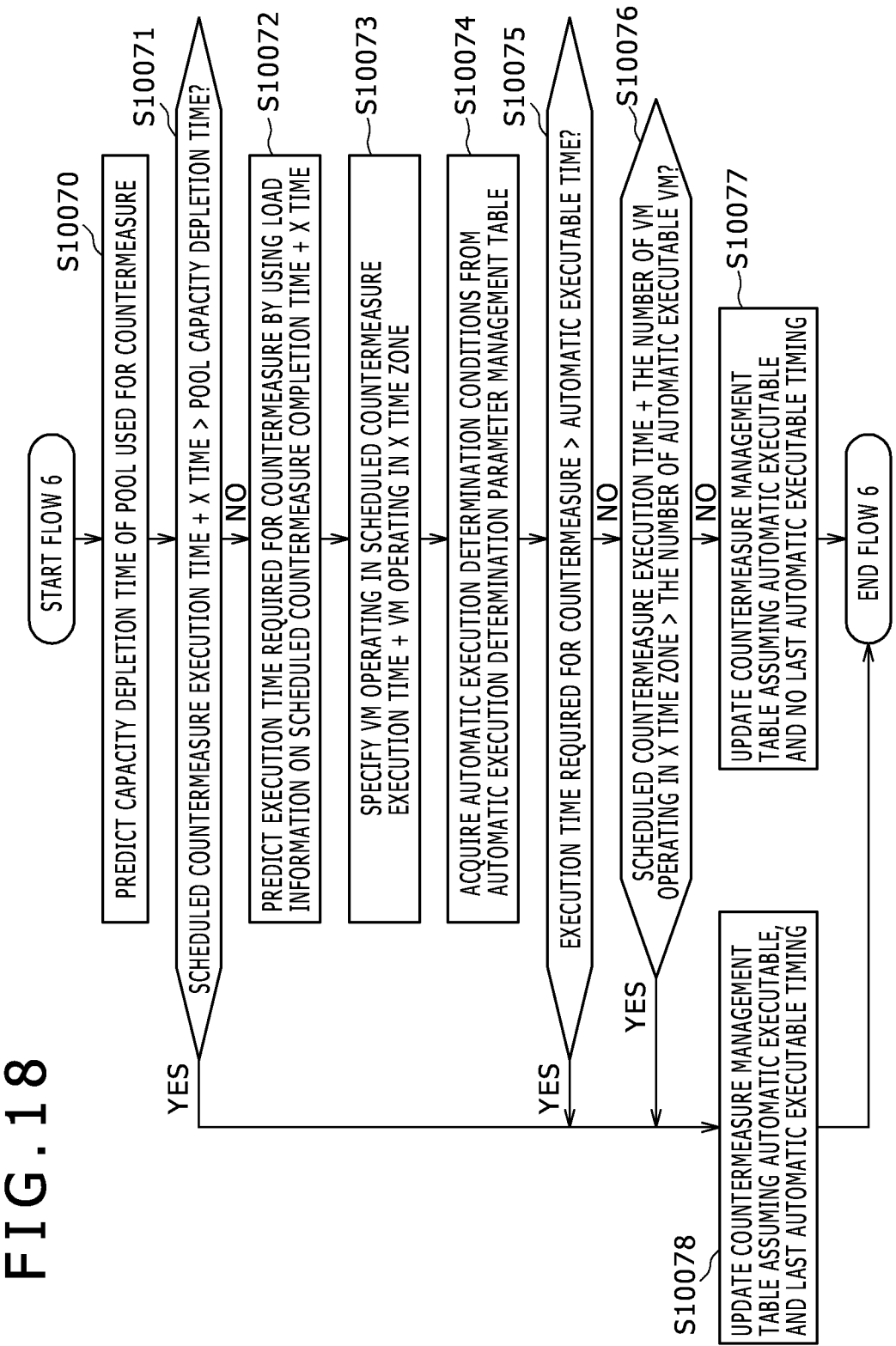
FIG. 18 illustrates a flowchart of an automatic execution last time determining process according to the first embodiment.

FIGS. 17 and 18 illustrate the details of the automatic execution propriety determining process which is executed in S10035 of FIG. 15. First, FIG. 17 is a flowchart illustrating whether the countermeasure X selected in S10005 can be automatically executed, or not, and whether it is a last automatically executable timing, or not, when the countermeasure X can be automatically executed. An order of the respective processing for determining the automatic execution determination attribute is not limited to the following order.

The countermeasure creating program 811 acquires information on the detailed information of the countermeasure X, the execution authority, the execution time, the execution cost, and the influenced VM ID of the countermeasure X from the creating countermeasure management table 807 (S10050). The countermeasure creating program 811 acquires the registered automatic execution determination condition from the automatic execution determination management table 808 (S10051).

Then, the countermeasure creating program 811 acquires the resources newly used by the execution of the countermeasure X from the countermeasure detailed information (S10052), and determines whether a resource determined to be automatic unexecutable is included in the acquired resources, or not (S10053). For example, in the countermeasure 1 of FIG. 15, the pool 3 which is a migration destination of the VVOL1 is specified as the resource newly used. Then, the pool 3 determines whether the automatic execution determination attribute 1701 of the automatic execution determination management table 808 is included in the resource registered in the determination parameter 1702 of the entry which is "use resource", or not. For example, in an example of FIG. 12, it is determined whether the pool 3 is a pool provided in the storage X, or not, and whether it is the resource not used by the VM X, or not.

If the determination in S10053 is negative, the countermeasure creating program 811 registers that the countermeasure cannot be automatically executed in the automatic execution propriety 1611 of the creating countermeasure management table 807 (no) (S10060), and completes the processing. If the determination in S10053 is positive, the countermeasure creating program 811 then determines whether the task requiring the management authority determined to be automatic unexecutable is included in the countermeasure X, or not (S10054). For example, the automatic execution determination attribute 1701 of the automatic execution determination management table 808 acquires the management authority registered in the determination parameter 1702 of the entry which is "execution authority", and determines whether the acquired management authority is included in the management authorities of the respective tasks configuring the countermeasure X acquired in S10052, or not.

If the determination in S10054 is negative, the countermeasure creating program 811 executes the processing of S10060, and completes the processing. If the determination in S10054 is positive, the countermeasure creating program 811 specifies the VM sharing the migration destination pool (S10055), and determines whether the number of VM operating in the scheduled countermeasure execution time is smaller than the number of automatically executable VM, or not (S10056). For example, the automatic execution determination attribute 1701 of the automatic execution determination management table 808 acquires the number of VM registered in the determination parameter 1702 of the entry which is "influenced VM number", and compares the acquired number of VM with the number of VM influenced by the countermeasure X acquired in S10050 to conduct the determination.

If the determination in S10056 is negative, the countermeasure creating program 811 executes the processing of S10060, and completes the processing. If the determination in S10056 is positive, the countermeasure creating program 811 determines whether the cost necessary for executing the countermeasure X is smaller than the cost determined to be automatic unexecutable, or not (S10057). For example, the automatic execution determination attribute 1701 of the automatic execution determination management table 808 acquires the cost registered in the determination parameter 1702 of the entry which is "execution cost", and compares the acquired cost with the cost necessary for execution of the countermeasure X acquired in S10050 to conduct the determination.

If the determination in S10057 is negative, the countermeasure creating program 811 executes the processing of S10060, and completes the processing. If the determination in S10057 is positive, the countermeasure creating program 811 determines whether the time necessary for executing the countermeasure X is smaller than the time determined to be automatic unexecutable, or not (S10058). For example, the automatic execution determination attribute 1701 of the automatic execution determination management table 808 acquires the execution time registered in the determination parameter 1702 of the entry which is "execution cost", and compares the acquired execution time with the time necessary for execution of the countermeasure X acquired in S10050 to conduct the determination.

If the determination in S10058 is negative, the countermeasure creating program 811 executes the processing of S10060, and completes the processing. If the determination in S10058 is positive, because all of the automatic execution conditions registered in the automatic execution determination management table 808 are satisfied, the countermeasure creating program 811 then executes the automatic execution last time determining process (S10059), and completes the processing.

FIG. 18 illustrates in the details of the automatic execution last time determining process which is executed in S10059 of FIG. 17. FIG. 18 is a flowchart for determining whether the scheduled countermeasure execution time received in S10000 is a last timing at which the countermeasure X can be automatically executed, or not, if the countermeasure X selected in S10005 can be automatically executed.

In this processing, assuming that the countermeasure X is executed at a time after the scheduled countermeasure execution time received in S10000, the countermeasure creating program 811 determines whether the countermeasure X can be automatically executed, or not, and if it is determined that the countermeasure X cannot be automatically executed, the countermeasure creating program 811 outputs the scheduled countermeasure execution time received in S10000 as a last time at which the countermeasure X can be automatically executed.

In the description of the following processing, "time after the scheduled countermeasure execution time" for determining whether the countermeasure X can be automatically executed, or not, is represented as "scheduled countermeasure execution time+X time". For example, a fixed value such as "one minute" is entered in X. For example, if the scheduled countermeasure execution time received in S10005 is "2012.4.1.12:00", the countermeasure creating program 811 determines whether the countermeasure X can be automatically executed at "2012.4.1.12:01", or not. If it is determined that the countermeasure cannot be automatically executed, "2012.4.1.12:00" is presented as the last timing at which the countermeasure X can be automatically executed. The X of "scheduled countermeasure execution time+X time" may be set in advance, according to the actual condition of the system management environment.

Hereinafter, the details of the automatic execution last time determining process will be described. The countermeasure creating program 811 predicts the capacity depletion time of the pool used for the countermeasure (S10070), and determines whether "scheduled countermeasure execution time+X time" is after a time when the capacity of the pool is depleted, or not (S10071). If the determination in S10071 is positive, at the time indicated by "scheduled countermeasure execution time+X time", a necessary capacity cannot be ensured in the migration destination pool, and the countermeasure X cannot be executed. For that reason, the countermeasure creating program 811 registers that the countermeasure X is "automatically executable (yes)", and that "scheduled countermeasure execution time+X time" is a last timing at which the countermeasure X is "automatically executable" in the automatic execution propriety 1611 of the creating countermeasure management table 807 (S10078), and completes the processing. In this case, since the execution per se of the countermeasure is disabled in "scheduled countermeasure execution time"+X time", the countermeasure creating program 811 may record that the above time is the last timing for execution of the countermeasure in an entry (not shown).

If the determination in S10071 is negative, the countermeasure creating program 811 calculates the time necessary for execution of the countermeasure X assuming that the countermeasure X is executed in "scheduled countermeasure execution time+X time" (S10072). Then, the countermeasure creating program 811 specifies the VM operating since "scheduled countermeasure execution time+X time" till "countermeasure execution completion time" among the VM using the pool used by the countermeasure X (S10073). Then, the countermeasure creating program 811 acquires the automatic execution propriety conditions from the automatic execution determination management table 808 (S10074).

Then, the countermeasure creating program 811 determines whether the time necessary for the countermeasure which is calculated in S10072 is larger than the execution time determined to be automatically executable, or not (S10075). If the determination in S10075 is positive, the countermeasure creating program 811 determines that the countermeasure X cannot be automatically executed in a time indicated by "scheduled countermeasure execution time+X time", executes the processing of S10078, and completes the processing. If the determination in S10075 is negative, the countermeasure creating program 811 determines whether the number of VM specified in S10073 is larger than the number of influenced VM determined to be automatically executable, or not (S10076).

If the determination in S10076 is positive, the countermeasure creating program 811 determines that the countermeasure X cannot be automatically executed in the time indicated by "scheduled countermeasure execution time+X time", executes the processing of S10078, and completes the processing. If the determination in S10076 is negative, the countermeasure creating program 811 can automatically execute the countermeasure X not only in the scheduled countermeasure execution time received in S1001, but also in the time indicated by "scheduled countermeasure execution time+X time". For that reason, the countermeasure creating program 811 registers that the countermeasure X can be automatically executed in an automatic execution propriety column of the creating countermeasure management table (S10077), and completes the processing.

Figure 19:
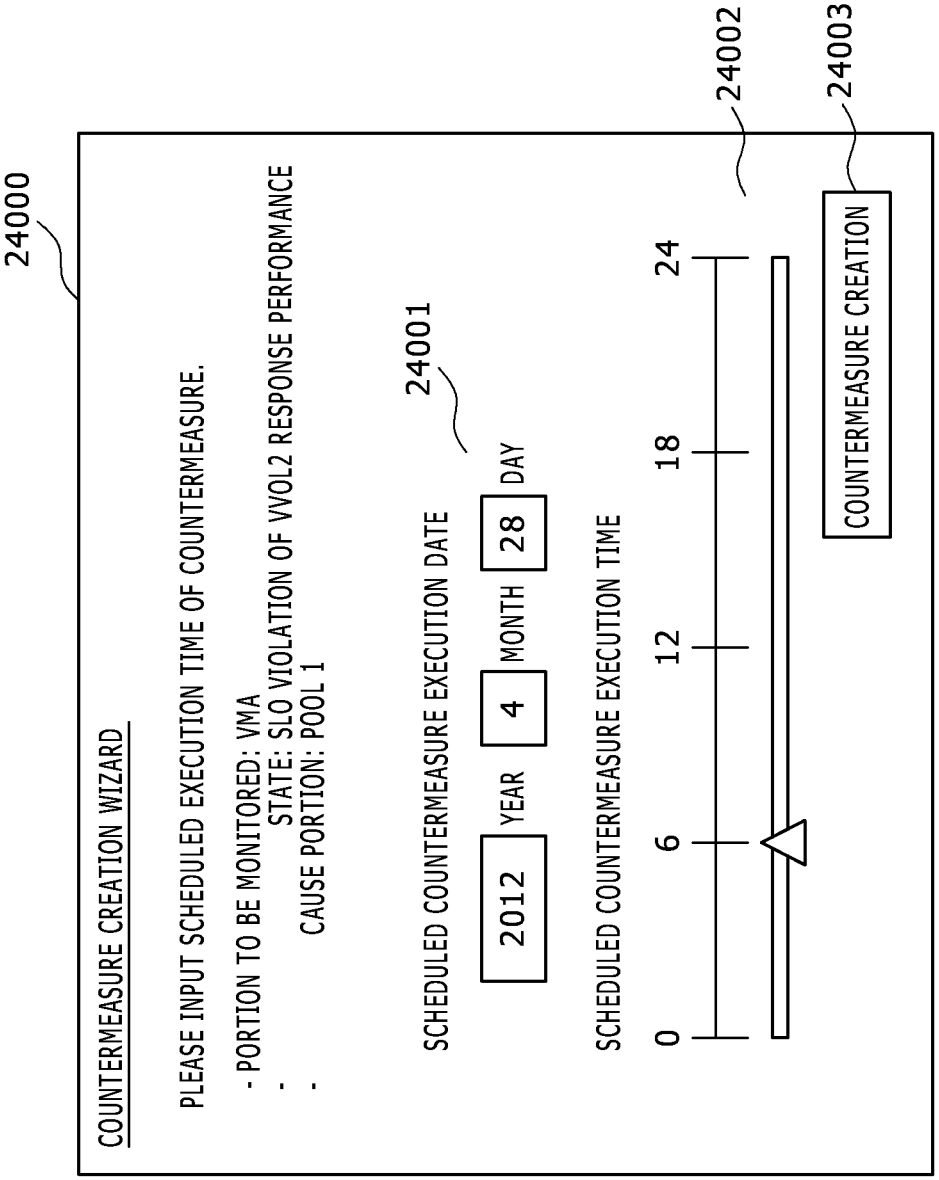
FIG. 19 illustrates a countermeasure execution scheduled time designation interface according to the first embodiment.

FIG. 19 illustrates a scheduled countermeasure execution time designation interface 24000. A state is detected by the state monitoring program 810, and may be displayed when outputting an alert, or may be displayed as a first start screen when accepting an instruction for a countermeasure creation start for that state from the input unit.

The scheduled countermeasure execution time designation interface 24000 includes a scheduled countermeasure execution date designation column 24001, a scheduled countermeasure execution time designation slider 24002, and a countermeasure creation button 24003. The manager can indicate the creation of the countermeasures applicable at a desired time by the scheduled countermeasure execution time designation interface 24000.

In the scheduled countermeasure execution date designation column 24001, an input of date scheduled to execute the countermeasure is accepted. In addition, a scheduled execution time is designated by moving the scheduled countermeasure execution time designation slider 24002 to right and left. The countermeasure creation button 24003 is pressed to execute the countermeasure creating process assuming that the countermeasure is executed at the designated scheduled countermeasure date. An input of not an actual date, but the number of hours since the present time till the scheduled countermeasure execution time such that what day the countermeasure is scheduled to be executed may be accepted.

FIG. 20 illustrates a countermeasure list presentation interface 25000. The interface 25000 is a screen for presenting a countermeasure list created by the processing in FIGS. 13 to 18. The countermeasure list presentation interface 25000 has a countermeasure list 25001. In the countermeasure list, the countermeasures registered in the creating countermeasure management table 807 are presented in an execution recommendation level order. The countermeasure ID is information for identifying the countermeasures. The task ID is information for identifying the tasks configuring the countermeasure. The task type is information indicative of the type of task. The task parameter is information for identifying parameters necessary for execution of the tasks. The task execution authority is information representing management authorities necessary for execution of the respective tasks. The response time is information representing the response time after the countermeasure has been executed. The execution time is information representing the time necessary for execution of the countermeasure. The execution cost is information representing the cost necessary for execution of the countermeasure. The influenced VM is information representing the VM likely to be affected by the countermeasure during execution of the countermeasure. The automatically executable propriety is information presenting whether the countermeasure can be automatically executed, or not. If the countermeasure can be automatically executed, the automatic execution propriety further presents information representing whether the scheduled execution time of the countermeasure that has accepted the input is the last timing at which the countermeasure can be automatically executed, or not. In the example of FIG. 20, if the automatic execution propriety column is yes, the automatic execution propriety represents whether the scheduled execution time is the last time at which the countermeasure can be automatically executed, or not (yes or no).

Instead of whether the scheduled execution time is the last time at which the countermeasure can be automatically executed, or not (yes or no), the last time at which the countermeasure can be automatically executed, or a deadline in which the countermeasure can be automatically executed may be displayed. For example, the automatic execution propriety determining process is executed every given time of X1, X2, X3, . . . Xn from the present time, for example, whether the countermeasure can be automatically executed, or not when the scheduled countermeasure execution time is set to 10:00, 11:00, or 12:00. Then, a time immediately before the automatic execution propriety determination is switched from yes to no is presented as an automatically executable deadline. For example, when the countermeasure is determined to be automatically executable at a time of X3, but as automatic unexecutable at a time of X4, the time of X3 is presented as the last time at which the countermeasure can be automatically executed.

Also, even if the countermeasure is determined to be automatic unexecutable, the countermeasure may be again automatically executed after a given time elapses. In order to cope with this case, instead of whether the scheduled execution time is the last timing at which the countermeasure can be automatically executed, or not (yes or not), and the automatic execution deadline, automatically executable time zone information may be presented to the manager.

Also, the execution recommendation level 1610 may be presented to the countermeasure list presentation interface 25000 so as to become helpful in determination by the manager.

When the manager selects a check box of the countermeasure to be executed, and presses the button for execution of the countermeasure, the CPU 212 of the management computer 201 conducts the following processing for execution of the selected countermeasure. In this example, when the countermeasure can be automatically executed, automatic execution control may be conducted without conducting the authorizing process of another manager.

Also, not the interface illustrated in FIG. 19 allows the manager to designate the scheduled countermeasure execution time, and the countermeasure list screen illustrated in FIG. 20 allows the countermeasure to be presented to the manager, but a screen 26000 illustrated in FIG. 21 may be output. The screen 26000 has a countermeasure execution date select column 26001 for selecting a countermeasure execution date, and a time specific countermeasure list 26002. When data for executing the countermeasure is selected from a date list presented to the countermeasure execution date select column 26001, the recommendation countermeasure is displayed every time zone in the time specific countermeasure list 26002.

As described above, in the first embodiment, the countermeasure that can be executed in the scheduled execution time designated by the manager is created taking the configuration of the computer system and the use trend of an infrastructure resource into account, and presented together with the automatic execution propriety. As a result, the system management load can be reduced.

Second Embodiment

Hereinafter, a second embodiment will be described. In the following description, configurations different from those in the first embodiment will be described particularly in detail, and a detailed description of the same configurations as those in the first embodiment will be omitted. In the first embodiment, the scheduled execution time of the countermeasure designated by the manager is accepted, and the countermeasure effective in that time is created and output, and present to the manager. On the other hand, in the second embodiment, the input of the scheduled execution time of the countermeasure is not accepted, but a process for creating the countermeasure higher in the effect, and automatically executing the countermeasure is conducted also taking a time for executing the countermeasure into account.

In this example, that the effect is higher means that the required/allowable requirements are more satisfied. For example, the time necessary for execution of the countermeasure, and the number of VM influenced by execution of the countermeasure are changed according to a timing at which the countermeasure is executed. For that reason, the countermeasure shorter in the time necessary for execution of the countermeasure, and executable at a time smaller in the number of influenced VM is created, and the automatic execution propriety is determined. As in the first embodiment, the countermeasure is actually automatically executable only when satisfying given conditions, and in the other cases, the execution permission based on the authorities of the respective managers is required.

FIG. 22 illustrates the creating countermeasure management table 807 in the second embodiment.

In the creating countermeasure management table 807 according to the second embodiment, the countermeasures and the effects can be managed every scheduled execution time. In the creating countermeasure management table 807 according to the second embodiment, a scheduled execution time 1613 which is the scheduled execution time of the countermeasure is stored in addition to information held by the creating countermeasure management table 807 described in the first embodiment.

Figure 23:
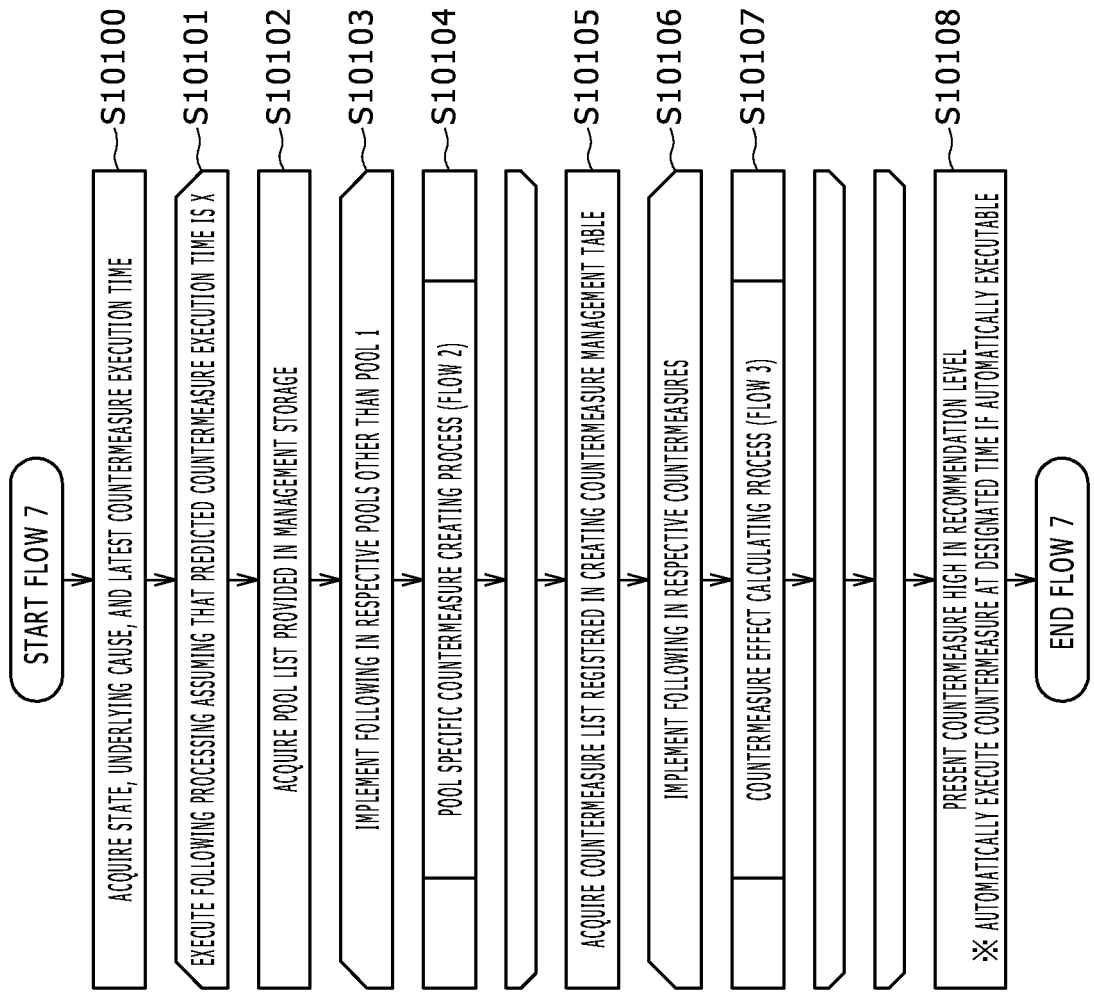
FIG. 23 is a flowchart of a countermeasure creating process according to the second embodiment.

FIG. 23 is a flowchart illustrating a flow of the countermeasure creating process according to the second embodiment. As in the first embodiment, the countermeasure creating program 811 executes the countermeasure creating process, for example, upon accepting the countermeasure creation instruction as a trigger. As in the first embodiment, the countermeasure creating program 811 acquires the state detected by the state monitoring program 810, and the root cause. In this example, a latest countermeasure execution time is acquired instead of the scheduled execution time of the first embodiment (S10100). The latest countermeasure execution time is a latest time at which the countermeasure execution is allowable. That is, the latest countermeasure execution time is a latest time at which the state is to be eliminated. The created countermeasure is executed in a time at which the required/allowable requirements are more satisfied, between the time when the countermeasure is created, and the time when the countermeasure is designated at the latest countermeasure execution time. The latest countermeasure execution time may be acquired upon accepting an input from the manager through the input unit.

The countermeasure creating program 811 designates arbitrary times X1, X2 . . . Xn since the present time till the times designated by the latest countermeasure execution time as the scheduled countermeasure execution times, and repetitively executes processing from S10102 to S10107. X1 . . . Xn may be set, for example, to time intervals (10:00, 11:00, 12:00 . . . ) in advance.

The processing from S10102 to S10107 is basically identical with the processing from S10001 to S10006 in the countermeasure creating process of the first embodiment. When the created countermeasure is registered in the creating countermeasure management table 807, the scheduled countermeasure execution time designated in S10101 is registered in a time 1613. After the processing till S10107 has been executed, the countermeasure creating program 811 acquires the created countermeasure list from the creating countermeasure management table 807, acquires the countermeasure highest in the recommendation level, and outputs the acquired countermeasure (S10108).

If the countermeasure acquired in S10108 is determined to be automatically executable, the countermeasure is automatically executed in the time registered in the scheduled execution time 1613. In the second embodiment, the automatic execution is determined to be based on "specific authority" with accepting the countermeasure creation instruction, and the countermeasure may be executed without accepting the actual countermeasure execution instruction from the manager. Also, when the countermeasure highest in the recommendation level is automatically unexecutable, as illustrated in FIG. 24 which will be described later, the countermeasure highest in the recommendation level among the automatically executable countermeasures may be displayed together. If the input of the manager is not accepted, the automatically executable countermeasure may be executed preferentially. Also, as in the first embodiment, plural countermeasures may be displayed in lower order of the execution recommendation levels.

FIG. 24 illustrates a countermeasure list presentation interface 29000. The countermeasure list presentation interface 29000 presents the countermeasures against the respective generated states. As the countermeasure against the respective states, the countermeasure highest in the recommendation level is presented among the countermeasures created by the processing of FIG. 23.

When the state to be improved also occurs in plural resources (VM), a method of creating the countermeasure is basically identical with that of the countermeasure creating process of FIG. 23. However, the prediction of the depletion time of the pool, the port load threshold excess time, and the prediction performance need to be calculated assuming that plural tasks is executed. Also, the countermeasures may be created in state occurrence order. However, when the countermeasures (tasks) are created under a situation where plural resources of the states to be improved is detected, the order of creating the countermeasures may be determined according to the seriousness of the states (a magnitude of a difference between the requested performance and the existing performance in the case of the performance delay).

A countermeasure list 29001 includes substantially the same contents as those of the items in a countermeasure list 25001 of FIG. 20. However, the scheduled execution time at which the automatically executable countermeasure is executed is displayed instead of information on the automatic execution propriety. In the scheduled execution time, a time registered in the scheduled execution time 1613 of the creating countermeasure management table 807 may be presented, or count down till the time registered in the scheduled execution time 1613 may be presented. Also, in the case of automatic executable, a button for canceling the execution is displayed, and the manager may be allowed to cancel the automatic execution. Unless the press of the cancel button is accepted till the scheduled execution time, the CPU 212 conducts the automatic execution control of the countermeasure.

Also, when the countermeasure that cannot be automatically executed, but can be executed in a normal manner is displayed together, the execution button is displayed together with the presentation of the countermeasure so that normal countermeasure execution assuming the authorities of the respective managers can be selected. In an example of FIG. 24, the time determined to be higher in the effects is designated as the execution time. The execution time designation of the manager may be accepted by the input unit. Also, when plural countermeasures is displayed in lower order of the execution recommendation levels, the countermeasures higher in the recommendation level are configured to be automatically executed preferentially. If the execution of the countermeasure scheduled to be automatically executed is canceled, the countermeasure which is second higher in the recommendation level and automatically executable may be automatically executed.

As described above, in second embodiment, the countermeasure is automatically executed in the time zone higher in the effects so that the management load can be reduced.

Third Embodiment

In the following description, configurations different from those in the first embodiment will be described particularly in detail, and a detailed description of the same configurations as those in the first embodiment will be omitted. In the first embodiment, the task for eliminating the state found by the state monitoring program 810, and the task for eliminating the state newly generated by execution of the countermeasure are presented as one countermeasure. In a third embodiment, those tasks can be divided, presented, and executed.

With the above configuration, in order to execute all of the tasks configuring the countermeasure, even if a time taken for the countermeasure is short, only a part of task is immediately executed so that the state to be minimally eliminated can be subjected to countermeasure. In this example, the countermeasure of the state to be minimally solved is, for example, to eliminate only the state detected by the state monitoring program 810. Even in this case, the state to be newly improved which is associated with the countermeasure against the state in question, and information on a size thereof are output, as a result of which disadvantages caused by not executing all of the tasks configuring the countermeasure can be grasped by the manager.

FIG. 25 illustrates the creating countermeasure management table 807 according to the third embodiment. In the creating countermeasure management table 807 according to the third embodiment, the effects when the tasks are executed can be managed every tasks configuring the countermeasure. In the creating countermeasure management table 807 according to the third embodiment, an execution time 1614 necessary for execution of each task, an execution cost 1615 necessary for each task, a state 1616 solved by the task execution, and a state 1617 (newly produced) remaining by the task execution are stored in addition to the information held by the creating countermeasure management table 807 described in the first embodiment.

As the execution time for each task and the execution cost for each task, the execution time and the cost for each task which are calculated as a progress when calculating the execution time necessary for execution of the countermeasure X in the countermeasure calculating process of FIG. 15, and the costs necessary for execution of the countermeasure X (processing in S10030 and S10032) may be registered. Also, the state accepted in S10000 of the countermeasure creating process of FIG. 13 is registered in the solved state 1616. Information related to the VM that does not satisfy the requirements, which is specified in S10015 of the pool specific countermeasure creating process in FIG. 14, is registered in the remaining state 1617.

FIG. 26 illustrates an execution task select interface 31000 according to the third embodiment. With the use of the countermeasure list presentation interface illustrated in FIG. 1, the execution task select interface 31000 may be output after accepting the selection of the countermeasure executed by the manager.

The execution task select interface 31000 in FIG. 26 includes a countermeasure detail 31001, an execution button (active) 31002, and an execution button (inactive) 31003, and presents the execution button for each of the tasks configuring the countermeasure. Because the task 2 in FIG. 26 is configured to eliminate a state (VM3 response delay) produced by the execution of the task 1, the execution button is activated first after the task 1 has been executed.

As described above, in the third embodiment, only the task that eliminates the minimal state among the tasks configuring the created countermeasure is instantaneously executed, and the remaining tasks can be executed in another time, for example, the scheduled countermeasure execution time designated by the manager in S10000. As a result, even if there is no time for executing all of the tasks, the countermeasure against the state to be minimally eliminated can be conducted, and a precision in the system management can be improved.

LIST OF REFERENCE SIGNS

101 . . . host computer 101, 103 . . . storage system, 201 . . . management computer, 251 . . . controller, 801 . . . VVOL management table, and 811 . . . countermeasure creating program

The invention claimed is:

1. A management computer coupled to a host computer and a storage device, the management computer comprising:
 a memory
 configured to store:
  virtual logical volume management information which is information for virtual logical volumes provided to the host computer by the storage device that includes information for identifying the host computer, information for identifying a virtual logical volume, and information denoting a first required performance which must be satisfied when the host computer accesses the storage device, and
  pool management information denoting information related to a use status of multiple pools that are each configured by a physical storage area group provided by the storage device, and information for allocating a physical storage area to the virtual logical volume according to a write access from the host computer; and
 a processor that is coupled to the memory, configured to:
 acquire performance information related to an access to the storage device from the host computer,
 determine whether the acquired performance information related to the access satisfies the first required performance
 specify, based on the virtual logical volume management information, a virtual logical volume which is a cause of the determination result, if the first required performance is not satisfied as a result of the determination,
 calculate a capacity consumption trend of the physical storage areas included in each pool based on the pool management information,
 create multiple countermeasures that each satisfies the first required performance which can be implemented after a given time based on the information on the specified virtual logical volume, and the calculated capacity consumption trend,
 calculate, for each of the multiple countermeasures, an execution recommendation level based on (a) to (d):
  (a) the first required performance,
  (b) a predetermined allowable down time,
  (c) the performance related to the access to the storage device, and
  (d) a time required for execution of the countermeasure when it is assumed that the respective countermeasures are executed, and
 output the created countermeasures and the calculated execution recommendation levels.

2. The management computer according to claim 1, wherein the first required performance is determined for a virtual machine executed by the host computer, and wherein the processor is configured to:
 acquire response performance information on the respective virtual logical volumes from the storage device, and store the acquired response performance information in the virtual logical volume management information,
 acquire VM response performance information related to an access to the virtual logical volume provided to the virtual machine from the virtual machine, from the host computer to conduct the determination,
 determine whether a response performance of the virtual logical volume provided to the virtual machine satisfies a second required performance corresponding to the first required performance based on the virtual logical volume management information if the acquired VM response performance does not satisfy the first required performance, and
 specify that the virtual logical volume is a cause of a state in which the first required performance is not satisfied if the second required performance is not satisfied.

3. The management computer according to claim 1, wherein the memory is configured to further store port management information indicative of performance information on ports provided in the storage device therein, and
wherein the processor is configured to:
 calculate a load increase trend of the port used in the access from the host computer based on the port management information, and
 create the countermeasure further based on the calculated load increase trend.

4. The management computer according to claim 2, wherein the countermeasure is configured by at least one kind of task selected from tasks consisting of the migration of the virtual logical volume to another pool, the migration of the virtual machine to another host computer, and the addition of the physical storage area to the pool.

5. The management computer according to claim 4, wherein the processor is configured to:
 predict whether the pool provides a free capacity necessary for migration of the virtual logical volume which is the cause of the state after the given time, or not, with the use of the calculated capacity consumption trend, and
 employ the migration of the virtual logical volume to the pool as a task configuring the countermeasure if the prediction result is positive.

6. The management computer according to claim 4, wherein the memory is configured to further store automatic execution policy information indicative of a policy allowing the processor to conduct an automatic execution control for executing tasks having a dependency relationship on execution order as a series of processes based on a first authority, and
wherein the processor is configured to:
 determine whether to conduct the automatic execution of the created countermeasure, or not, based on the automatic execution policy information, and
 output a determination result to the output device.

7. The management computer according to claim 6, wherein the processor is configured to:
   create the countermeasures that can be implemented at each of a plurality of times having a given duration, and
   conduct the automatic execution control on any countermeasure highest in the execution recommendation level among the created countermeasures determined to be automatically executable.

8. The management computer according to claim 1, wherein the memory is configured to further store execution authority information for each type of the tasks, and
   wherein the processor is configured to determine the automatic execution propriety of the countermeasure based on the execution authority information and the automatic execution policy information.

9. The management computer according to claim 1, wherein the processor is configured to:
   create the countermeasures that can be implemented at each of a plurality of times having a given duration, and
   output any countermeasure highest in the execution recommendation level among the created countermeasures to the output device.

10. A method for managing a host computer and a storage device, comprising the steps of:
   storing virtual logical volume management information which is information on for virtual logical volumes provided to the host computer by the storage device that includes information for identifying the host computer, information for identifying a virtual logical volume, and information denoting a first required performance which must be satisfied when the host computer accesses the storage device, and pool management information denoting information related to a use status of multiple pools that are each configured by a physical storage area group provided by the storage device, and allocating a real physical storage area to the virtual logical volume according to a write access from the host computer;
   acquiring performance information related to an access to the storage device from the host computer;
   determining whether the acquired performance information related to the access satisfies the first required performance;
   specifying, based on the virtual logical volume management information, a virtual logical volume which is a cause of the determination result, if the first required performance is not satisfied as a result of the determination;
   calculating a capacity consumption trend of the physical storage areas included in each pool based on the pool management information; and
   creating a multiple countermeasures that each satisfies the first required performance which can be implemented after a given time based on the information on the specified virtual logical volume, and the calculated capacity consumption trend
   calculating, for each of the multiple countermeasures, an execution recommendation level based on (a) to (d):
      (a) the first required performance,
      (b) a predetermined allowable down time,
      (c) the performance related to the access to the storage device, and
      (d) a time required for execution of the countermeasure when it is assumed that the respective countermeasures are executed, and
   output the created countermeasures and the calculated execution recommendation levels.

* * * * *